(12) United States Patent
Lu

(10) Patent No.: US 12,454,514 B2
(45) Date of Patent: Oct. 28, 2025

(54) QUINAZOLINONE COMPOUNDS

(71) Applicant: Cerepeut, Inc., Stanford, CA (US)

(72) Inventor: Bingwei Lu, Stanford, CA (US)

(73) Assignee: Cerepeut, Inc., Stanford, CA (US)

( * ) Notice: Subject to any disclaimer, the term of this patent is extended or adjusted under 35 U.S.C. 154(b) by 945 days.

(21) Appl. No.: 17/434,145

(22) PCT Filed: Feb. 26, 2020

(86) PCT No.: PCT/US2020/019942
§ 371 (c)(1),
(2) Date: Aug. 26, 2021

(87) PCT Pub. No.: WO2020/176652
PCT Pub. Date: Sep. 3, 2020

(65) Prior Publication Data
US 2022/0162172 A1 May 26, 2022

Related U.S. Application Data

(60) Provisional application No. 62/811,471, filed on Feb. 27, 2019.

(51) Int. Cl.
*C07D 239/95* (2006.01)
*A61P 35/00* (2006.01)

(52) U.S. Cl.
CPC ............ *C07D 239/95* (2013.01); *A61P 35/00* (2018.01)

(58) Field of Classification Search
CPC ................................ C07D 239/95; A61P 35/00
See application file for complete search history.

(56) References Cited

U.S. PATENT DOCUMENTS

| | | | |
|---|---|---|---|
| 4,861,780 A | 8/1989 | Takahashi et al. | |
| 2003/0220227 A1 | 11/2003 | Gungor et al. | |
| 2005/0038051 A1* | 2/2005 | Nunnari ............... | C07D 277/38 514/266.3 |
| 2015/0017262 A1 | 1/2015 | Qian et al. | |
| 2019/0307749 A1 | 10/2019 | Reddy et al. | |

FOREIGN PATENT DOCUMENTS

| | | |
|---|---|---|
| CA | 3075649 A1 | 3/2019 |
| CN | 111372921 A | 7/2020 |
| JP | 2013142070 A | 7/2013 |
| JP | 7170341 B2 | 11/2022 |
| WO | 2013/025508 A1 | 2/2013 |
| WO | 2019/055528 A1 | 3/2019 |
| WO | 2019/126179 A1 | 6/2019 |

OTHER PUBLICATIONS

Cassidy-Stone, A. et al., "Chemical Inhibition of the Mitochondrial Division Dynamin Reveals Its Role in Bax/Bak-Dependent Mitochondrial Outer Membrane Permeabilization," Developmental Cell, 14:193-204, 2008.
Matrix Scientific, "Safety Data Sheet", Feb. 21, 2017, 4 pages.
International Search Report and Written Opinion for corresponding International Application No. PCT/US2020/019942, mailed May 22, 2020, 6 pages.

* cited by examiner

*Primary Examiner* — Marcos L Sznaidman
(74) *Attorney, Agent, or Firm* — Kilpatrick Townsend & Stockton LLP—West Coast

(57) ABSTRACT

New quinazolinone compounds are disclosed, as well as pharmaceutical compositions containing quinazolinones and methods for the treatment of diseases and conditions associated with mitochondrial dysfunction.

20 Claims, No Drawings

QUINAZOLINONE COMPOUNDS

CROSS-REFERENCES TO RELATED APPLICATIONS

The present application claims priority to U.S. Provisional Pat. Appl. No. 62/811,471, filed on Feb. 27, 2019, which application is incorporated herein by reference in its entirety.

BACKGROUND OF THE INVENTION

Mitochondrial dysfunction can affect cellular function in a number of ways. First of all, as the cellular power plant, mitochondria provide the key source of ATP. Mitochondrial dysfunction will result in cellular energy deficit and impaired maintenance of cellular vitality.

Second, mitochondria hosts the electron transport chain involved in oxidative phosphorylation. This process generates reactive oxygen species (ROS) that under basal condition may provide some signaling function, but defective mitochondria are inefficient in the electron transfer process, resulting in elevated ROS production, which can cause damage to a variety of macromolecules (proteins, nucleic acids, lipids, etc.). Such oxidative damage has been extensively linked to diseases, especially age-related diseases. Third, mitochondria are important organelles in maintaining cellular calcium homeostasis. They uptake calcium released from intracellular stores, especially the ER, or calcium resulting from excitation.

Dysfunctional mitochondria may alter cellular calcium homeostasis and cause conditions such as ER stress that have been linked to a number of disease conditions. Moreover, mitochondrial calcium is essential for the activities of certain enzymes in the TCA cycle and the electron transport chain. Therefore, altered mitochondrial calcium homeostasis can lead to mitochondrial energetic deficit. Finally, as gatekeepers of cell life and cell death, mitochondria regulate both apoptotic and necrotic cell death. Thus at their most extreme, disturbances involving these pathways may trigger untimely cell death and cause degenerative disease. Conversely, the lack of appropriate cell death can lead to inappropriate tissue growth and development of cancers, which are often characterized by altered mitochondrial metabolism.

A large number of major human diseases, many of which represent urgent unmet medical needs, have been associated with mitochondrial dysfunction. These range from cancer and neurodegenerative diseases (such as Alzheimer's disease, Parkinson's disease, and ALS to brain injuries such as stroke, seizures, neuropathic pain, traumatic brain injury, spinal cord injury, aneurysm, and subarachnoid hemorrhage) to certain non-neurological disorders (such as sepsis, acute kidney injury, cardiorenal syndrome, cardiac ischemia-reperfusion injury, pulmonary arterial hypertension, chronic obstructive pulmonary disease, and vasoconstriction).

BRIEF SUMMARY OF THE INVENTION

Provided here are compounds according to Formula I:

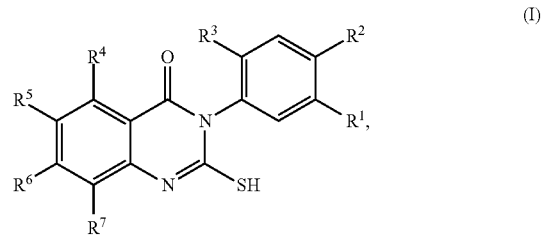

and pharmaceutically acceptable salts thereof, wherein:
  $R^1$, $R^2$, and $R^3$ are independently selected from the group consisting of $C_{1-6}$ alkyl, $C_{1-6}$ alkoxy, and halogen, wherein at least one of $R^1$-$R^3$ is halogen;
  $R^4$, $R^5$, $R^6$, and $R^7$ are independently selected from the group consisting of hydrogen, halogen, $C_{1-6}$ alkyl, $C_{1-6}$ alkoxy, $C_{3-8}$ cycloalkyl, $C_{1-6}$ alkenyl, —$OR^a$, and —$N(R^b)_2$;
  each $R^a$ is independently selected from the group consisting of hydrogen, $C_{1-6}$ alkyl, $C_{3-8}$ cycloalkyl, $C_{2-7}$ acyl, —$C(O)OR^{a1}$, and —$C(O)N(R^{a2})_2$, wherein
    each $R^{a1}$ is selected from the group consisting of $C_{1-6}$ alkyl, $C_{3-8}$ cycloalkyl, and $C_{6-10}$ aryl, and
    each $R^{a2}$ is independently selected from hydrogen, $C_{1-6}$ alkyl, $C_{3-8}$ cycloalkyl, and $C_{6-10}$ aryl;
  each $R^b$ is independently selected from the group consisting of hydrogen, $C_{1-6}$ alkyl, $C_{3-8}$ cycloalkyl, $C_{2-7}$ acyl, —$SO_2R^{b1}$, —$C(O)OR^{b1}$, and —$C(O)N(R^{a2})_2$, wherein
    each $R^{b1}$ is selected from the group consisting of $C_{1-6}$ alkyl, $C_{3-8}$cycloalkyl, and $C_{6-10}$ aryl, and
    each $R^{b2}$ is independently selected from hydrogen, $C_{1-6}$ alkyl, $C_{3-8}$cycloalkyl, and $C_{6-10}$ aryl;
  provided that at least one of $R^4$-$R^7$ is other than hydrogen when $R^1$, $R^2$, and $R^3$ are halogen;
  provided that at least one of $R^4$-$R^7$ is other than hydrogen when $R^1$ is methyl, $R^2$ is chloro, and $R^3$ is methoxy;
  provided that at least one of $R^4$-$R^7$ is other than hydrogen when $R^1$ is methoxy or isopropoxy, $R^2$ is chloro, and $R^3$ is chloro;
  provided that at least one of $R^4$, $R^6$, and $R^7$ is other than hydrogen when $R^1$ is methoxy or isopropoxy, $R^2$ is chloro, $R^3$ is chloro, and $R^5$ is methyl or chloro; and
  provided that at least one of $R^4$, $R^5$, and $R^7$ is other than hydrogen when $R^1$ is methoxy or isopropoxy, $R^2$ is chloro, $R^3$ is chloro, and $R^6$ is chloro.

Also provided herein are methods for treating a disease or condition associated with mitochondrial dysfunction. The methods include administering an effective amount of a compound or pharmaceutical composition as described herein to a subject in need thereof. In some embodiments, the disease/condition is cancer, a neurodegenerative disease, a non-neurological disorder, or aging.

DETAILED DESCRIPTION OF THE INVENTION

I. Definitions

As used herein, the term "alkyl," by itself or as part of another substituent, refers to a straight or branched, saturated, aliphatic radical having the number of carbon atoms indicated. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, etc. Alkyl can also refer to alkyl groups having up to 20 carbons atoms, such as, but not limited to heptyl, octyl, nonyl, decyl, etc. Alkyl groups can be substituted or unsubstituted. For example, "substituted alkyl" groups can be substituted with one or more groups selected from halo, hydroxy, amino, alkylamino, amido, acyl, nitro, cyano, and alkoxy.

As used herein, the term "alkoxy," by itself or as part of another substituent, refers to a group having the formula —OR, wherein R is alkyl.

As used herein, the terms "halo" and "halogen," by themselves or as part of another substituent, refer to a fluorine, chlorine, bromine, or iodine atom.

As used herein, the term "cycloalkyl," by itself or as part of another substituent, refers to a saturated or partially unsaturated, monocyclic, fused bicyclic or bridged polycyclic ring assembly containing from 3 to 12 ring atoms, or the number of atoms indicated. Cycloalkyl can include any number of carbons, such as $C_{3-6}$, $C_{4-6}$, $C_{5-6}$, $C_{3-8}$, $C_{4-8}$, $C_{5-8}$, $C_{6-8}$, $C_{3-9}$, $C_{3-10}$, $C_{3-11}$, and $C_{3-12}$. Saturated monocyclic cycloalkyl rings include, for example, cyclopropyl, cyclobutyl, cyclopentyl, cyclohexyl, and cyclooctyl. Saturated bicyclic and polycyclic cycloalkyl rings include, for example, norbornane, [2.2.2] bicyclooctane, decahydronaphthalene and adamantane. Cycloalkyl groups can also be partially unsaturated, having one or more double or triple bonds in the ring. Representative cycloalkyl groups that are partially unsaturated include, but are not limited to, cyclobutene, cyclopentene, cyclohexene, cyclohexadiene (1,3- and 1,4-isomers), cycloheptene, cycloheptadiene, cyclooctene, cyclooctadiene (1,3-, 1,4- and 1,5-isomers), norbornene, and norbornadiene. When cycloalkyl is a saturated monocyclic $C_{3-8}$ cycloalkyl, exemplary groups include, but are not limited to cyclopropyl, cyclobutyl, cyclopentyl, cyclohexyl, cycloheptyl and cyclooctyl. When cycloalkyl is a saturated monocyclic $C_{3-6}$ cycloalkyl, exemplary groups include, but are not limited to cyclopropyl, cyclobutyl, cyclopentyl, and cyclohexyl. Cycloalkyl groups can be substituted or unsubstituted. For example, "substituted cycloalkyl" groups can be substituted with one or more groups selected from halo, hydroxy, amino, alkylamino, amido, acyl, nitro, cyano, and alkoxy.

As used herein, the term "alkenyl," by itself or as part of another substituent, refers to a straight chain or branched hydrocarbon of 2 to 6 carbon atoms, having at least one double bond. Examples of alkenyl groups include, but are not limited to, vinyl, propenyl, isopropenyl, butenyl, isobutenyl, butadienyl, pentenyl or hexadienyl. Alkenyl groups can be substituted or unsubstituted. For example, "substituted alkenyl" groups can be substituted with one or more groups selected from halo, hydroxy, amino, alkylamino, amido, acyl, nitro, cyano, and alkoxy.

As used herein, the term "aryl," by itself or as part of another substituent, refers to an aromatic ring system having any suitable number of carbon ring atoms and any suitable number of rings. Aryl groups can include any suitable number of carbon ring atoms, such as $C_6$, $C_7$, $C_8$, $C_9$, $C_{10}$, $C_{11}$, $C_{12}$, $C_{13}$, $C_{14}$, $C_{15}$ or $C_{16}$, as well as $C_{6-10}$, $C_{6-12}$, or $C_{6-14}$. Aryl groups can be monocyclic, fused to form bicyclic (e.g., benzocyclohexyl) or tricyclic groups, or linked by a bond to form a biaryl group. Representative aryl groups include phenyl, naphthyl and biphenyl. Other aryl groups include benzyl, having a methylene linking group. Some aryl groups have from 6 to 12 ring members, such as phenyl, naphthyl or biphenyl. Other aryl groups have from 6 to 10 ring members, such as phenyl or naphthyl. Some other aryl groups have 6 ring members, such as phenyl. Aryl groups can be substituted or unsubstituted. For example, "substituted aryl" groups can be substituted with one or more groups selected from halo, hydroxy, amino, alkylamino, amido, acyl, nitro, cyano, and alkoxy.

As used herein, the term "carbonyl," by itself or as part of another substituent, refers to —C(O)—, i.e., a carbon atom double-bonded to oxygen and bound to two other groups in the moiety having the carbonyl.

As used herein, the term "amino" refers to a moiety —$NR_2$, wherein each R group is hydrogen or alkyl. An amino moiety can be ionized to form the corresponding ammonium cation.

As used herein, the term "sulfonyl" refers to a moiety —$SO_2R$, wherein the R group is alkyl, haloalkyl, or aryl. An amino moiety can be ionized to form the corresponding ammonium cation. "Alkylsulfonyl" refers to an amino moiety wherein the R group is alkyl.

As used herein, the term "hydroxy" refers to the moiety —OH.

As used herein, the term "cyano" refers to a carbon atom triple-bonded to a nitrogen atom (i.e., the moiety —C≡N).

As used herein, the term "carboxy" refers to the moiety —C(O)OH. A carboxy moiety can be ionized to form the corresponding carboxylate anion.

As used herein, the term "amido" refers to a moiety —NRC(O)R or —C(O)$NR_2$, wherein each R group is hydrogen or alkyl.

As used herein, the term "acyl" refers to a moiety —C(O)R wherein each R is alkyl.

As used herein, the term "nitro" refers to the moiety —$NO_2$.

As used herein, the term "oxo" refers to an oxygen atom that is double-bonded to a compound (i.e., O=).

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder. In various aspects, the term covers any treatment of a subject, including a mammal (e.g., a human), and includes: (i) preventing the disease from occurring in a subject that can be predisposed to the disease but has not yet been diagnosed as having it; (ii) inhibiting the disease, i.e., arresting its development; or (iii) relieving the disease, i.e., causing regression of the disease. In one aspect, the subject is a mammal such as a primate, and, in a further aspect, the subject is a human. The term "subject" also includes domesticated animals (e.g., cats, dogs, etc.), livestock (e.g., cattle, horses, pigs, sheep, goats, etc.), and laboratory animals (e.g., mouse, rabbit, rat, guinea pig, fruit fly, etc.).

As used herein, the term "prevent" or "preventing" refers to precluding, averting, obviating, forestalling, stopping, or hindering something from happening, especially by advance action. It is understood that where reduce, inhibit, or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein.

As used herein, the phrase "identified to be in need of treatment for a disorder," or the like, refers to selection of a subject based upon need for treatment of the disorder. For example, a subject can be identified as having a need for treatment of a disorder (e.g., a disorder related to Alzheimer's disease) based upon an earlier diagnosis by a person of skill and thereafter subjected to treatment for the disorder. It is contemplated that the identification can, in one aspect, be performed by a person different from the person making the diagnosis.

It is also contemplated, in a further aspect, that the administration can be performed by one who subsequently performed the administration.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, sublingual administration, buccal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition. In further various aspects, a preparation can be administered prophylactically; that is, administered for prevention of a disease or condition.

The term "contacting" as used herein refers to bringing a disclosed compound and a cell, target receptor, or other biological entity together in such a manner that the compound can affect the activity of the target (e.g., receptor, transcription factor, cell, etc.), either directly; i.e., by interacting with the target itself, or indirectly; i.e., by interacting with another molecule, co-factor, factor, or protein on which the activity of the target is dependent.

As used herein, the terms "effective amount" and "amount effective" refer to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various aspects, a preparation can be administered in a "prophylactically effective amount"; that is, an amount effective for prevention of a disease or condition.

As used herein, the term "pharmaceutically acceptable excipient" refers to a substance that aids the administration of an active agent to a subject. By "pharmaceutically acceptable," it is meant that the excipient is compatible with the other ingredients of the formulation and is not deleterious to the recipient thereof. Pharmaceutical excipients useful in the present invention include, but are not limited to, binders, fillers, disintegrants, lubricants, glidants, coatings, sweeteners, flavors and colors.

As used herein, the term "salt" refers to acid or base salts of the compounds of the invention. Illustrative examples of pharmaceutically acceptable salts are mineral acid (hydrochloric acid, hydrobromic acid, phosphoric acid, and the like) salts, organic acid (acetic acid, propionic acid, glutamic acid, citric acid and the like) salts, and quaternary ammonium (methyl iodide, ethyl iodide, and the like) salts. It is understood that the pharmaceutically acceptable salts are non-toxic.

Pharmaceutically acceptable salts of the acidic compounds of the present invention are salts formed with bases, namely cationic salts such as alkali and alkaline earth metal salts (such as sodium, lithium, potassium, calcium, and magnesium salts), as well as ammonium salts (such as ammonium, trimethylammonium, diethylammonium, and tris-(hydroxymethyl)-methyl-ammonium salts).

Similarly acid addition salts, such as of mineral acids, organic carboxylic and organic sulfonic acids, e.g., hydrochloric acid, methanesulfonic acid, maleic acid, are also possible provided a basic group, such as pyridyl, constitutes part of the structure.

The neutral forms of the compounds can be regenerated by contacting the salt with a base or acid and isolating the parent compound in the conventional manner. The parent form of the compound differs from the various salt forms in certain physical properties, such as solubility in polar solvents, but otherwise the salts are equivalent to the parent form of the compound for the purposes of the present invention.

As used herein, the terms "optional" or "optionally" means that the subsequently described event or circumstance can or cannot occur, and that the description includes instances where said event or circumstance occurs and instances where it does not.

II. Quinazolinone Compounds

Provided herein are compounds according to Formula I:

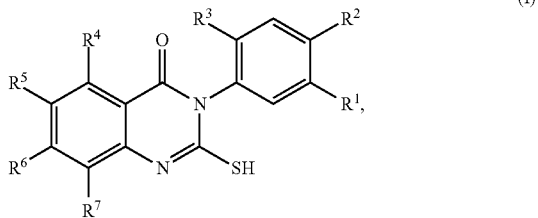

(I)

and pharmaceutically acceptable salts thereof, wherein:
$R^1$, $R^2$, and $R^3$ are independently selected from the group consisting of $C_{1-6}$ alkyl, $C_{1-6}$ alkoxy, and halogen, wherein at least one of $R^1$-$R^3$ is halogen;
$R^4$, $R^5$, $R^6$, and $R^7$ are independently selected from the group consisting of hydrogen, halogen, $C_{1-6}$ alkyl, $C_{1-6}$ alkoxy, $C_{3-8}$ cycloalkyl, $C_{1-6}$ alkenyl, —$OR^a$, and —$N(R^b)_2$;
each $R^a$ is independently selected from the group consisting of hydrogen, $C_{1-6}$ alkyl, $C_{3-8}$ cycloalkyl, $C_{2-7}$ acyl, —$C(O)OR^{a1}$, and —$C(O)N(R^{a2})_2$, wherein
each $R^{a1}$ is selected from the group consisting of $C_{1-6}$ alkyl, $C_{3-8}$ cycloalkyl, and $C_{6-10}$ aryl, and
each $R^{a2}$ is independently selected from hydrogen, $C_{1-6}$ alkyl, $C_{3-8}$ cycloalkyl, and $C_{6-10}$ aryl;
each $R^b$ is independently selected from the group consisting of hydrogen, $C_{1-6}$ alkyl, $C_{3-8}$ cycloalkyl, $C_{2-7}$ acyl, —$SO_2R^{b1}$, —$C(O)OR^{b1}$, and —$C(O)N(R^{a2})_2$, wherein
each $R^{b1}$ is selected from the group consisting of $C_{1-6}$ alkyl, $C_{3-8}$cycloalkyl, and $C_{6-100}$ aryl, and
each $R^{b2}$ is independently selected from hydrogen, $C_{1-6}$ alkyl, $C_{3-8}$ cycloalkyl, and $C_{6-100}$ aryl;
provided that at least one of $R^4$-$R^7$ is other than hydrogen when $R^1$, $R^2$, and $R^3$ are halogen;
provided that at least one of $R^4$-$R^7$ is other than hydrogen when $R^1$ is methyl, $R^2$ is chloro, and $R^3$ is methoxy;
provided that at least one of $R^4$-$R^7$ is other than hydrogen when $R^1$ is methoxy or isopropoxy, $R^2$ is chloro, and $R^3$ is chloro;
provided that at least one of $R^4$, $R^6$, and $R^7$ is other than hydrogen when $R^1$ is methoxy or isopropoxy, $R^2$ is chloro, $R^3$ is chloro, and $R^5$ is methyl or chloro; and
provided that at least one of $R^4$, $R^5$, and $R^7$ is other than hydrogen when $R^1$ is methoxy or isopropoxy, $R^2$ is chloro, $R^3$ is chloro, and $R^6$ is chloro.

At least one of $R^1$-$R^3$ in compounds of Formula I is halogen. For example, each of $R^1$, $R^2$, and $R^3$ can independently be fluoro (F), chloro (Cl), bromo (Br), or iodo (I). In some embodiments, $R^2$ is halogen. In some embodiments, $R^2$ and $R^3$ are halogen. In some embodiments, $R^2$ and $R^3$ are chloro. In some embodiments, $R^2$ is fluoro and $R^3$ is chloro. In some embodiments, $R^1$, $R^2$, and $R^3$ are halogen. In some embodiments, $R^1$ is fluoro and $R^2$ and $R^3$ are chloro.

In some embodiments, at least one of $R^1$-$R^3$ is $C_{1-6}$ alkoxy. For example, each of $R^1$, $R^2$, $R^3$ can independently be methoxy, ethoxy, n-propoxy, isopropoxy, n-butoxy, isobutoxy, sec-butoxy, tert-butoxy, n-pentyloxy, branched pentyloxy, n-hexyloxy, or branched hexyloxy. In some embodiments, $R^1$ and $R^2$ are $C_{1-6}$ alkoxy. In some embodiments, $R^1$ and $R^3$ are $C_{1-6}$ alkoxy. In some embodiments, $R^2$ and $R^3$ are $C_{1-6}$ alkoxy. In some embodiments, $R^1$ is $C_{1-6}$ alkoxy (e.g., methoxy), and $R^2$ is halogen (e.g., fluoro, chloro, or bromo) or $C_{1-6}$ alkoxy (e.g., methoxy).

In some embodiments, at least one of $R^1$-$R^3$ is $C_{1-6}$ alkyl. For example, each of $R^1$, $R^2$, $R^3$ can independently be methyl, ethyl, n-propyl, isopropyl, n-butyl, isobutyl, sec-butyl, tert-butyl, n-pentyl, branched pentyl, n-hexyl, or branched hexyl. In some embodiments, $R^1$ is $C_{1-6}$ alkyl. In some embodiments, $R^2$ is $C_{1-6}$ alkyl. In some embodiments, $R^3$ is $C_{1-6}$ alkyl. In some embodiments, $R^1$ is $C_{1-6}$ alkoxy (e.g., methoxy), $R^2$ is halogen (e.g., fluoro, chloro, or bromo) or $C_{1-6}$ alkoxy (e.g., methoxy), and $R^3$ is $C_{1-6}$ alkyl (e.g., methyl).

$R^4$, $R^5$, $R^6$, and $R^7$ are independently selected from the group consisting of hydrogen, halogen, $C_{1-6}$ alkyl, $C_{1-6}$ alkoxy, $C_{3-8}$ cycloalkyl, $C_{1-6}$ alkenyl, —$OR^a$, and —$N(R^b)_2$. For example, each of $R^4$, $R^5$, $R^6$, and $R^7$ can independently be hydrogen, $C_{1-6}$ alkyl, $C_{1-6}$ alkoxy, $C_{3-8}$ cycloalkyl, $C_{1-6}$ alkenyl, —$OR^a$, or —$N(R^b)_2$. In some embodiments, each of $R^4$, $R^5$, $R^6$, and $R^7$ is independently hydrogen, halogen, $C_{1-6}$ alkoxy, $C_{3-8}$ cycloalkyl, $C_{1-6}$ alkenyl, —$OR^a$, or —$N(R^b)_2$. In some embodiments, each of $R^4$, $R^5$, $R^6$, and $R^7$ is independently hydrogen, halogen, $C_{1-6}$ alkyl, $C_{3-8}$ cycloalkyl, $C_{1-6}$ alkenyl, —$OR^a$, or —$N(R^b)_2$. In some embodiments, each of $R^4$, $R^5$, $R^6$, and $R^7$ is independently hydrogen, halogen, $C_{1-6}$ alkyl, $C_{1-6}$ alkoxy, $C_{1-6}$ alkenyl, —$OR^a$, or —$N(R^b)_2$. In some embodiments, each of $R^4$, $R^5$, $R^6$, and $R^7$ is independently hydrogen, halogen, $C_{1-6}$ alkyl, $C_{1-6}$ alkoxy, $C_{3-8}$ cycloalkyl, —$OR^a$, or —$N(R^b)_2$. In some embodiments, each of $R^4$, $R^5$, $R^6$, and $R^7$ is independently hydrogen, halogen, $C_{1-6}$ alkyl, $C_{1-6}$ alkoxy, $C_{3-8}$ cycloalkyl, $C_{1-6}$ alkenyl, or —$N(R^b)_2$. In some embodiments, each of $R^4$, $R^5$, $R^6$, and $R^7$ is independently hydrogen, halogen, $C_{1-6}$ alkyl, $C_{1-6}$ alkoxy, $C_{3-8}$ cycloalkyl, $C_{1-6}$ alkenyl, or —$OR^a$. In any of these embodiments, $R^1$, $R^2$, and $R^3$ can be defined according to any of the combinations set forth above.

In some embodiments, $R^4$ is hydrogen. In some embodiments, $R^4$ is hydrogen and $R^7$ is $C_{1-6}$ alkyl, $C_{3-8}$ cycloalkyl, or $C_{1-6}$ alkenyl. $R^7$ can be, for example, methyl, ethyl, n-propyl, isopropyl, n-butyl, isobutyl, sec-butyl, tert-butyl, n-pentyl, branched pentyl, n-hexyl, branched hexyl, cyclopropyl, cyclobutyl, cyclopentyl, cyclohexyl, cycloheptyl, cyclooctyl, vinyl, propenyl, isopropenyl, butenyl, isobutenyl, butadienyl. In some embodiments, $R^7$ is hydrogen, $C_{3-8}$ cycloalkyl (e.g., cyclopropyl) or $C_{1-6}$ alkenyl (e.g., vinyl).

In some embodiments, $R^6$ is $C_{1-6}$ alkoxy. For example, $R^6$ can be methoxy, ethoxy, n-propoxy, isopropoxy, n-butoxy, isobutoxy, sec-butoxy, tert-butoxy, n-pentyloxy, branched pentyloxy, n-hexyloxy, or branched hexyloxy. In some embodiments, $R^6$ is $C_{1-6}$ alkoxy and $R^5$ is selected from hydrogen, halogen, —$OR^a$, and —$N(R^b)_2$; in some such embodiments, $R^4$ is hydrogen. In some embodiments, $R^5$ and $R^6$ are independently selected from the group consisting of $C_{1-6}$ alkoxy, $C_{3-8}$ cycloalkyl, —$OR^a$, and —$N(R^b)_2$; in some such embodiments, $R^4$ is hydrogen. In some embodiments, $R^6$ is $C_{1-6}$ alkoxy and $R^5$ is selected from hydrogen, halogen, —OH, and —$NH_2$; in some such embodiments; $R^4$ is hydrogen. In any of these embodiments, $R^7$ can be defined according to any of the combinations set forth above. In some embodiments, $R^7$ is hydrogen. In some embodiments, $R^4$ and $R^7$ are hydrogen.

In some embodiments, compounds of Formula I and pharmaceutically acceptable salts thereof are provided, wherein:
$R^1$ is $C_{1-6}$ alkyl;
$R^2$ and $R^3$ are independently selected halogen;
$R^4$ and $R^7$ are hydrogen;

$R^5$ is selected from the group consisting of $C_{1-6}$ alkoxy, $C_{1-6}$ alkyl, $C_{3-8}$ cycloalkyl, $C_{1-6}$ alkenyl, —$OR^a$, —$N(R^b)_2$, and hydrogen; and $R^6$ is $C_{1-6}$ alkoxy.

In some embodiments, $R^1$ is $C_{1-6}$ alkoxy; $R^2$ and $R^3$ are independently selected halogen; $R^4$ and $R^7$ are hydrogen; $R^5$ is other than halogen; and $R^6$ is $C_{1-6}$ alkoxy. In some embodiments, $R^1$ is $C_{1-6}$ alkoxy; $R^2$ and $R^3$ are independently selected halogen; $R^4$ and $R^7$ are hydrogen; $R^5$ is other than chloro; and $R^6$ is $C_{1-6}$ alkoxy.

In some embodiments, compounds of Formula I and pharmaceutically acceptable salts thereof are provided, wherein:

$R^1$ is $C_{1-6}$ alkoxy;
$R^2$ and $R^3$ are independently selected halogen;
$R^4$ and $R^7$ are hydrogen;
$R^5$ is halogen; and
$R^6$ is selected from the group consisting of $C_{1-6}$ alkyl, $C_{3-8}$ cycloalkyl, $C_{1-6}$ alkenyl, —$OR^a$, —$N(R^b)_2$, halogen, and hydrogen.

In some embodiments, $R^1$ is $C_{1-6}$ alkoxy; $R^2$ and $R^3$ are independently selected halogen; $R^4$ and $R^7$ are hydrogen; $R^5$ is halogen; and $R^6$ is other than $C_{1-6}$ alkoxy. In some such embodiments, $R^1$ is $C_{1-6}$ alkoxy; $R^2$ and $R^3$ are independently selected halogen; $R^4$ and $R^7$ are hydrogen; $R^5$ is halogen; and $R^6$ is other than methoxy.

Compounds according to Formula I can be further substituted. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents are generally those that result in the formation of stable or chemically feasible compounds. The term "stable," as used herein, refers to compounds that are not substantially altered when subjected to conditions to allow for their production, detection, and, in certain embodiments, their recovery, purification, and use for one or more of the purposes disclosed herein. In general, "substituted," as used herein, does not encompass replacement and/or alteration of a key functional group by which a molecule is identified, e.g., such that the "substituted" functional group becomes, through substitution, a different functional group. For example, a "substituted phenyl" group must still comprise the phenyl moiety and cannot be modified by substitution, in this definition, to become, e.g., a cyclohexyl group.

Examples of suitable monovalent substituents on a substitutable carbon atom of an "optionally substituted" group are independently halogen; —$(CH_2)_{0-4}R^\alpha$; —$(CH_2)_{0-4}OR^\alpha$; —$O(CH_2)_{0-4}R^\alpha$, —$O$—$(CH_2)_{0-4}C(O)OR^\alpha$; —$(CH_2)_{0-4}CH(OR^\alpha)_2$; —$(CH_2)_{0-4}SR^\alpha$; —$(CH_2)_{0-4}Ph$, wherein Ph is phenyl which may be substituted with $R^\alpha$; —$(CH_2)_{0-4}O(CH_2)_{0-1}$phenyl, which phenyl may be substituted with $R^\alpha$; —$CH$=$CHPh$, wherein Ph is phenyl which may be substituted with $R^\alpha$; —$(CH_2)_{0-4}O(CH_2)_{0-1}$-Py, wherein Py is pyridyl which may be substituted with $R^\alpha$; —$NO_2$; —$CN$; —$N_3$; —$(CH_2)_{0-4}N(R^\alpha)_2$; —$(CH_2)_{0-4}N(R^\alpha)C(O)R^\alpha$; —$N(R^\alpha)C(S)R^\alpha$; —$(CH_2)_{0-4}N(R^\alpha)C(O)NR^\alpha_2$; —$N(R^\alpha)C(S)NR^\alpha_2$; —$(CH_2)_{0-4}N(R^\alpha)C(O)OR^\alpha$; —$N(R^\alpha)N(R^\alpha)C(O)R^\alpha$; —$N(R^\alpha)N(R^\alpha)C(O)NR^\alpha_2$; —$N(R^\alpha)N(R^\alpha)C(O)OR^\alpha$; —$(CH_2)_{0-4}C(O)R^\alpha$; —$C(S)R^\alpha$; —$(CH_2)_{0-4}C(O)OR^\alpha$; —$(CH_2)_{0-4}C(O)SR^\alpha$; —$(CH_2)_{0-4}C(O)OSiR^\alpha_3$; —$(CH_2)_{0-4}OC(O)R^\alpha$; —$OC(O)(CH_2)_{0-4}SR$—$SC(S)SR^\alpha$; —$(CH_2)_{0-4}SC(O)R^\alpha$; —$(CH_2)_{0-4}C(O)NR^\alpha_2$; —$C(S)NR^\alpha_2$; —$C(S)SR^\alpha$; —$SC(S)SR^\alpha$, —$(CH_2)_{0-4}OC(O)NR^\alpha_2$; —$C(O)N(OR^\alpha)R^\alpha$; —$C(O)C(O)R^\alpha$; —$C(O)CH_2C(O)R^\alpha$; —$C(NOR^\alpha)R^\alpha$; —$(CH_2)_{0-4}SSR^\alpha$; —$(CH_2)_{0-4}S(O)_2R^\alpha$; —$(CH_2)_{0-4}S(O)_2OR^\alpha$; —$(CH_2)_{0-4}OS(O)_2R^\alpha$; —$S(O)_2NR^\alpha_2$; —$(CH_2)_{0-4}S(O)R^\alpha$; —$N(R^\alpha)S(O)_2NR^\alpha_2$; —$N(R^\alpha)S(O)_2R^\alpha$; —$N(OR^\alpha)R^\alpha$; —$C(NH)NR^\alpha_2$; —$P(O)_2R^\alpha$; —$P(O)R^\alpha_2$; —$OP(O)R^\alpha_2$; —$OP(O)(OR^\alpha)_2$; $SiR^\alpha_3$; —$(C_{1-4}$ straight or branched)alkylene)-O—$N(R^\alpha)_2$; or —$(C_{1-4}$ straight or branched)alkylene)C(O)O—$N(R^\alpha)_2$. Each $R^\alpha$ is independently hydrogen; $C_{1-6}$ alkyl; —$CH_2Ph$, —$O(CH_2)_{0-1}Ph$; —$CH_2$-(5- to 6-membered heteroaryl); $C_{3-8}$ cycloalkyl; $C_{6-10}$ aryl; 4- to 10-membered heterocyclyl; or 6- to 10-membered heteroaryl; and each $R^\alpha$ may be further substituted as described below.

Examples of suitable monovalent substituents on $R^\alpha$ are independently halogen, —$(CH_2)_{0-2}R^\beta$; —$(CH_2)_{0-2}OH$; —$(CH_2)_{0-2}OR^\beta$; —$(CH_2)_{0-2}CH(OR^\beta)_2$; —$CN$; —$N_3$; —$(CH_2)_{0-2}C(O)R^\beta$; —$(CH_2)_{0-2}C(O)OH$; —$(CH_2)_{0-2}C(O)OR^\beta$; —$(CH_2)_{0-2}SR^\beta$; —$(CH_2)_{0-2}SH$; —$(CH_2)_{0-2}NH_2$; —$(CH_2)_{0-2}NHR^\beta$; —$(CH_2)_{0-2}NR^\beta_2$; —$NO_2$; $SiR^\beta_3$; —$OSiR^\beta_3$; —$C(O)SR^\beta$; —$(C_{1-4}$ straight or branched alkylene)C(O)OR^\beta$; or —$SSR^\beta$; wherein each $R^\beta$ is independently selected from $C_{1-4}$ alkyl; —$CH_2Ph$; —$O(CH_2)_{0-1}Ph$; $C_{3-8}$ cycloalkyl; $C_{6-10}$ aryl; 4- to 10-membered heterocyclyl; or 6- to 10-membered heteroaryl. Suitable divalent substituents on a saturated carbon atom of $R^\alpha$ include =O and =S.

Examples of suitable divalent substituents on a saturated carbon atom of an "optionally substituted" group include the following: =O; =S; =NNR$^\gamma_2$; =NNHC(O)R$^\gamma$; =NNHC(O)OR$^\gamma$; =NNHS(O)$_2$R$^\gamma$; =NR$^\gamma$; =NOR$^\gamma$; —O(C(R$^\gamma_2$))$_{2-3}$O—; or —S(C(R$^\gamma_2$))$_{2-3}$S—; wherein each independent occurrence of $R^\gamma$ is selected from hydrogen; $C_{1-6}$alkyl, which may be substituted as defined below; $C_{3-8}$ cycloalkyl; $C_{6-100}$ aryl; 4- to 10-membered heterocyclyl; or 6- to 10-membered heteroaryl. Suitable divalent substituents that are bound to vicinal substitutable carbons of an "optionally substituted" group include: —$O(CR^\beta_2)_{2-3}O$—; wherein each independent occurrence of R is selected from hydrogen; $C_{1-6}$ alkyl which may be substituted as defined below; $C_{3-8}$ cycloalkyl; $C_{6-10}$ aryl; 4- to 10-membered heterocyclyl; or 6- to 10-membered heteroaryl.

Examples of suitable substituents on the alkyl group of $R^\gamma$ include halogen; —$R^\delta$; —OH; —$OR^\delta$; —CN; —C(O)OH; —C(O)$OR^\delta$; —$NH_2$; —$NHR^\delta$; —$NR^\delta_2$; or —$NO_2$; wherein each $R^\delta$ is independently $C_{1-4}$ alkyl; —$CH_2Ph$; —$O(CH_2)_{0-1}Ph$; 4- to 10-membered heterocyclyl; or 6- to 10-membered heteroaryl.

Examples of suitable substituents on a substitutable nitrogen of an "optionally substituted" group include —$R^\varepsilon$; —$NR^\varepsilon_2$; —$C(O)R^\varepsilon$; —$C(O)OR^\varepsilon$; —$C(O)C(O)R^\varepsilon$; —$C(O)CH_2C(O)RE$; —$S(O)_2R$; —$S(O)_2NR^\varepsilon_2$; —$C(S)NR^\varepsilon_2$; —$C(NH)NR^\varepsilon_2$; or —$N(R^\varepsilon)S(O)_2R^\varepsilon$; wherein each $R^\varepsilon$ is independently hydrogen; $C_{1-6}$ alkyl which may be substituted as defined below; $C_{3-8}$ cycloalkyl; $C_{6-10}$ aryl; 4- to 10-membered heterocyclyl; or 6- to 10-membered heteroaryl.

Examples of suitable substituents on the alkyl group of $R^\varepsilon$ are independently halogen; —$R^\delta$; —OH; —$OR^\delta$; —CN; —C(O)OH; —C(O)$OR^\delta$; —$NH_2$; —$NHR^\delta$; —$NR^\delta_2$; or —$NO_2$; wherein each $R^\delta$ is independently $C_{1-4}$ alkyl; —$CH_2Ph$; —$O(CH_2)_{0-1}Ph$; $C_{6-10}$ aryl; 4- to 10-membered heterocyclyl; or 6- to 10-membered heteroaryl.

In some embodiments, the compound is selected from the group consisting of:

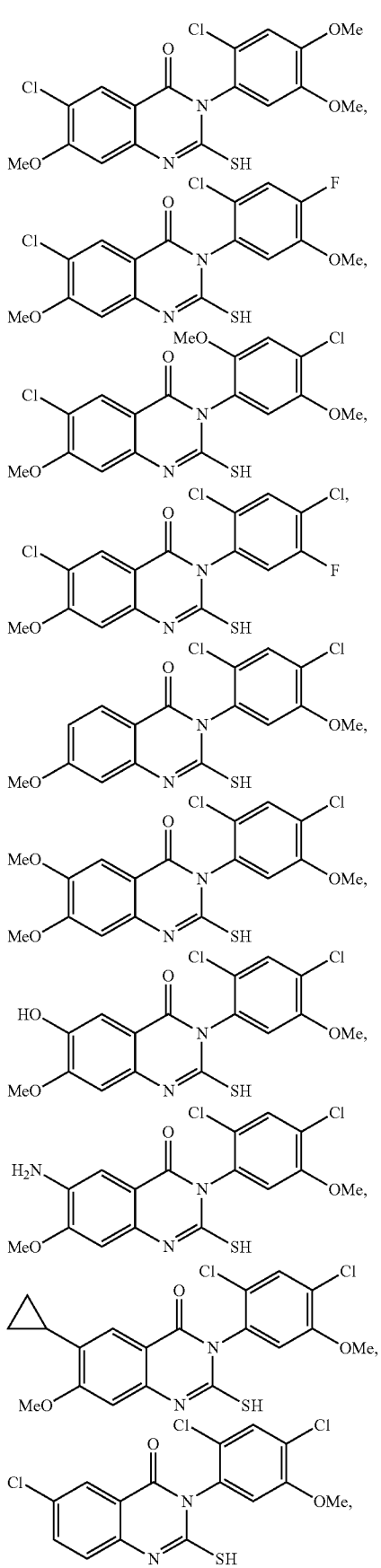

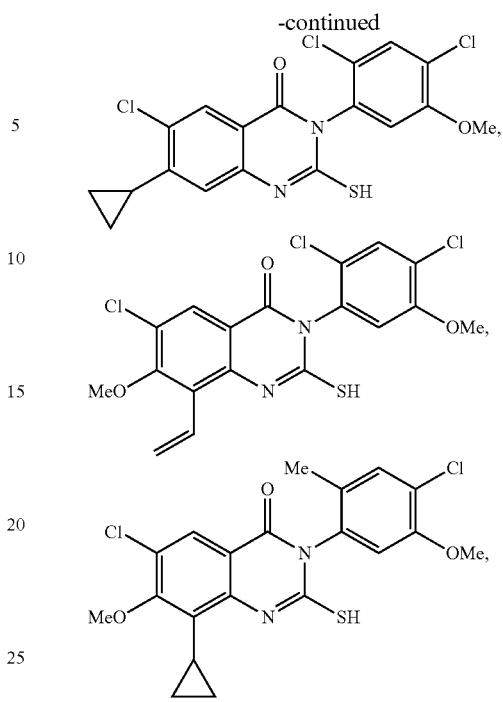

and pharmaceutically acceptable salts thereof.

The starting materials and reagents used in preparing the compounds of the invention are either available from commercial suppliers or are prepared by methods known to those skilled in the art following procedures set forth in references such as Fieser and Fieser's *Reagents for Organic Synthesis*, Vol. 1-28 (Wiley, 2016); March's *Advanced Organic Chemistry*, 7$^{th}$ Ed. (Wiley, 2013); and Larock's *Comprehensive Organic Transformations*, 2$^{nd}$ Ed. (Wiley, 1999). The starting materials and the intermediates of the reaction can be isolated and purified if desired using conventional techniques including, but not limited to, filtration, distillation, crystallization, chromatography and the like. Such materials can be characterized using conventional means, including measuring physical constants and obtaining spectral data.

In some embodiments, compounds according to Formula I can be prepared by combining an isothiocyanate according to Formula II

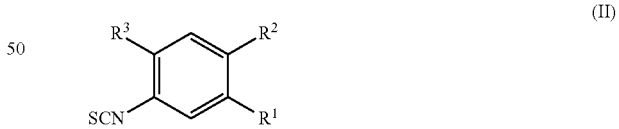

(II)

with an aminobenzoic acid according to Formula III

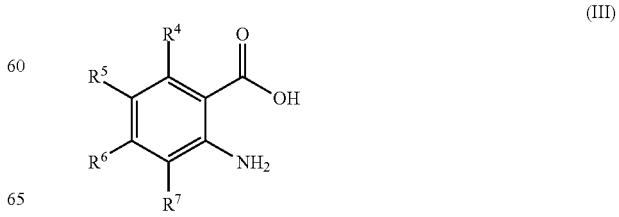

(III)

and maintaining the resulting mixture under conditions sufficient to form a quinazolinone according to Formula I. Isothiocyanates according to Formula II can be prepared from the corresponding anilines via reaction with thiophosgene. Aminobenzoic acids according to Formula III can be prepared from commercially available anthranilic acid and substituted analogs thereof, as described below.

Unless specified to the contrary, the reactions described herein take place at atmospheric pressure over a temperature range of from about −78° C. to about 250° C. For example, reactions can be conducted at from about 0° C. to about 125° C., or at about room (or ambient) temperature, e.g., about 20° C. In some embodiments, reactions are conducted at about 0° C., 20° C., 25° C., 90° C., 100° C., 110° C., 125° C., 150° C., 175° C., or 200° C. In some embodiments, reactions are conducted starting at a first temperature (e.g., about −78° C. or about 0° C.), and allowed to warm to a higher second temperature (e.g., about 20° C. or about 25° C.). One of skill in the art will appreciate that various modifications to the procedures described herein can be made.

III. Pharmaceutical Compositions

Also provided herein are pharmaceutical compositions containing one or more compounds as described above and one or more pharmaceutically acceptable carriers or other excipients. The pharmaceutical compositions can be prepared by any of the methods well known in the art of pharmacy and drug delivery. In general, methods of preparing the compositions include the step of bringing the active ingredient into association with a carrier containing one or more accessory ingredients. The pharmaceutical compositions are typically prepared by uniformly and intimately bringing the active ingredient into association with a liquid carrier or a finely divided solid carrier or both, and then, if necessary, shaping the product into the desired formulation. The compositions can be conveniently prepared and/or packaged in unit dosage form.

The pharmaceutical compositions can be in the form of a sterile injectable aqueous or oleaginous solutions and suspensions. Sterile injectable preparations can be formulated using non-toxic parenterally-acceptable vehicles including water, Ringer's solution, and isotonic sodium chloride solution, and acceptable solvents such as 1,3-butane diol. In addition, sterile, fixed oils are conventionally employed as a solvent or suspending medium.

For this purpose any bland fixed oil can be employed including synthetic mono- or diglycerides. In addition, fatty acids such as oleic acid find use in the preparation of injectables.

Aqueous suspensions contain the active ingredient in admixture with excipients suitable for the manufacture of aqueous suspensions. Such excipients include, but are not limited to: suspending agents such as sodium carboxymethylcellulose, methylcellulose, oleagino-propylmethylcellulose, sodium alginate, polyvinyl-pyrrolidone, gum tragacanth and gum acacia; dispersing or wetting agents such as lecithin, polyoxyethylene stearate, and polyethylene sorbitan monooleate; and preservatives such as ethyl, n-propyl, and p-hydroxybenzoate.

Oily suspensions can be formulated by suspending the active ingredient in a vegetable oil, for example, arachis oil, olive oil, sesame oil or coconut oil, or in a mineral oil such as liquid paraffin. The oily suspensions can contain a thickening agent, for example beeswax, hard paraffin or cetyl alcohol. These compositions can be preserved by the addition of an anti-oxidant such as ascorbic acid.

Dispersible powders and granules (suitable for preparation of an aqueous suspension by the addition of water) can contain the active ingredient in admixture with a dispersing agent, wetting agent, suspending agent, or combinations thereof. Additional excipients can also be present.

The pharmaceutical compositions of the invention can also be in the form of oil-in-water emulsions. The oily phase can be a vegetable oil, for example olive oil or arachis oil, or a mineral oil, for example liquid paraffin or mixtures of these. Suitable emulsifying agents can be naturally-occurring gums, such as gum acacia or gum tragacanth; naturally-occurring phospholipids, such as soy lecithin; esters or partial esters derived from fatty acids and hexitol anhydrides, such as sorbitan monooleate; and condensation products of said partial esters with ethylene oxide, such as polyoxyethylene sorbitan monooleate.

Pharmaceutical compositions containing compounds of the present disclosure can also be in a form suitable for oral use. Suitable compositions for oral administration include, but are not limited to, tablets, troches, lozenges, aqueous or oily suspensions, dispersible powders or granules, emulsions, hard or soft capsules, syrups, elixirs, solutions, buccal patches, oral gels, chewing gums, chewable tablets, effervescent powders, and effervescent tablets. Compositions for oral administration can be formulated according to any method known to those of skill in the art. Such compositions can contain one or more agents selected from sweetening agents, flavoring agents, coloring agents, antioxidants, and preserving agents in order to provide pharmaceutically elegant and palatable preparations.

Tablets generally contain the active ingredient in admixture with non-toxic pharmaceutically acceptable excipients, including: inert diluents, such as cellulose, silicon dioxide, aluminum oxide, calcium carbonate, sodium carbonate, glucose, mannitol, sorbitol, lactose, calcium phosphate, and sodium phosphate; granulating and disintegrating agents, such as corn starch and alginic acid; binding agents, such as polyvinylpyrrolidone (PVP), cellulose, polyethylene glycol (PEG), starch, gelatin, and acacia; and lubricating agents such as magnesium stearate, stearic acid, and talc. The tablets can be uncoated or coated, enterically or otherwise, by known techniques to delay disintegration and absorption in the gastrointestinal tract and thereby provide a sustained action over a longer period. For example, a time delay material such as glyceryl monostearate or glyceryl distearate can be employed. Tablets can also be coated with a semi-permeable membrane and optional polymeric osmogents according to known techniques to form osmotic pump compositions for controlled release.

Compositions for oral administration can be formulated as hard gelatin capsules wherein the active ingredient is mixed with an inert solid diluent (such as calcium carbonate, calcium phosphate, or kaolin), or as soft gelatin capsules wherein the active ingredient is mixed with water or an oil medium (such as peanut oil, liquid paraffin, or olive oil).

Transdermal delivery of compounds according to the present disclosure can be accomplished by means of iontophoretic patches and the like. The compound can also be administered in the form of suppositories for rectal administration of the drug. These compositions can be prepared by mixing the drug with a suitable non-irritating excipient which is solid at ordinary temperatures but liquid at the rectal temperature and will therefore melt in the rectum to release the drug. Such materials include cocoa butter and polyethylene glycols.

In some embodiments, the pharmaceutical composition includes one or more compounds as set forth above and one or more additional active agents. In some embodiments, pharmaceutical compositions containing one or more additional active agents for treatment of neurological diseases are provided. Examples of such active agents include, but are not limited to, cholinesterase inhibitors (e.g., donepezil, donepezil/memantine, galantamine, rivastigmine, tacrine, or the like), alpha-7 nicotinic receptor modulators (e.g., alpha-7 agonists such as encenicline and APN1125), serotonin modulators (e.g., idalopirdine, RVT-101, citalopram, escitalopram, fluoxetine, fluvoxamine, paroxetine, sertraline, or the like), NMDA modulators (e.g., NMDA receptor antagonists such as memantine), Aβ-targeted therapies (e.g., pioglitazone, begacestat, atorvastatin, simvastatin, etazolate, tramiprosate, or the like), ApoE-targeted therapies (e.g., retinoid X receptor agonists), tau-targeted therapies (e.g., methylthioninium, leuco-methylthioninium, or the like), and anti-inflammatories (e.g., NSAIDs such as apazone, diclofenac, ibuprofen, indomethacin, ketoprofen, nabumetone, naproxen, piroxicam, or sulindac).

In some embodiments, pharmaceutical compositions containing one or more compounds of the present disclosure and one or more additional active agents for treatment of cancer are provided. Examples of such active agents include, but are not limited to, angiogenesis inhibitors (e.g., bevacizumab, ranibizumab, and the like), immune checkpoint inhibitors (e.g., a CTLA-4 antibody, an OX40 antibody, a PD-L1 antibody, a PD1 antibody, or a BY55 antibody), anthracyclines (e.g., doxorubicin, daunorubicin, and the like), platins (e.g., cisplatin, oxaliplatin, carboplatin, and the like), antimetabolites (e.g., 5-fluorouracil, methotrexate, and the like), kinase inhibitors (e.g., erlotinib, gefitinib, and the like), nucleoside analogs (e.g., gemcitabine, cytarabine, and the like), and taxanes (e.g., paclitaxel, docetaxel, and the like).

IV. Methods of Treatment

Compounds and pharmaceutical composition of the present disclosure are useful for treating diseases and conditions associated with mitochondrial dysfunction. Such diseases include, but are not limited to, cancer, neurodegenerative diseases, brain conditions, and non-neurological disorders.

In some embodiments, methods are provided wherein the disease or condition is a neurodegenerative disease. Examples of neurodegenerative diseases include, but are not limited to, tauopathies (e.g., as described by Josephs; *Mayo Clinic Proceedings,* 2017, 92(8) 1291-1303), synucleinopathies (e.g., as described by Savica, et al.; *Mayo Clinic Proceedings,* 2019, 94(9), 1825-1831), Parkinson's disease, Alzheimer's disease, Gaucher's disease, amyotrophic lateral sclerosis, and Huntington's disease. In some embodiments, the neurodegenerative disease is the neurodegenerative disease is Parkinson's disease, Alzheimer's disease, amyotrophic lateral sclerosis, or Huntington's disease.

In some embodiments, methods are provided wherein the disease or condition is a brain condition. Examples of brain conditions include, but are not limited to, stroke, seizures, neuropsychiatric conditions (including, but not limited to, depression, schizophrenia, autism-spectrum disorders, fragile X, and bipolar disorder), neuropathic pain, traumatic brain injury, spinal cord injury, aneurysm, and subarachnoid hemorrhage. In some embodiments, the brain condition is stroke, seizure, neuropathic pain, traumatic brain injury, spinal cord injury, aneurysm, or subarachnoid hemorrhage.

In some embodiments, methods are provided wherein the disease or condition is a non-neurological disorder. Examples of non-neurological disorders include, but are not limited to, diabetes, acute kidney injury, kidney fibrosis, non-alcoholic steatohepatitis (NASH), liver fibrosis, idiopathic pulmonary fibrosis, cardiac fibrosis, scleroderma, myelofibrosis, pancreatic fibrosis, mitochondrial myopathies (including, but not limited to, myopathy, encephalopathy, lactic acidosis and stroke-like episodes (MELAS); nyoclonus, epilepsy, and ragged red fibers (MERRF); and ataxia neuropathy syndromes (ANS), as described by Pfeffer and Chinery; *Annals of Medicine,* 2013 45:1, 4-16), age-related macular degeneration (AMD; e.g., dry (atrophic) AMD), congenital mitochondrial diseases (including, but not limited to, Leber's hereditary optic neuropathy (LHON), Leigh syndrome, and Barth syndrome), sepsis, cardiorenal syndrome, cardiac ischemia-reperfusion injury, pulmonary arterial hypertension, chronic obstructive pulmonary disease, and vasoconstriction. In some embodiments, the non-neurological disorder is sepsis, acute kidney injury, cardiorenal syndrome, cardiac ischemia-reperfusion injury, pulmonary arterial hypertension, chronic obstructive pulmonary disease, or vasoconstriction. In some embodiments, the condition is human aging caused by mitochondrial dysfunction.

Also provided are methods and compositions for reducing cancer cell proliferation, e.g., in an individual having a cancer, e.g., so as to treat the cancer. By cancer it is meant the group of diseases involving unregulated cell growth. In cancer, cells proliferate, i.e., divide, uncontrollably, forming malignant tumors, and invading nearby parts of the body. The cancer may also metastasize, that is, spread to more distant parts of the body through the lymphatic system or bloodstream. The treatment may be prophylactic in terms of completely or partially preventing a cancer or symptom thereof and/or may be therapeutic in terms of a partial or complete cure for a cancer and/or adverse effect attributable to the cancer.

Treatment of cancer can include: (a) preventing the cancer from occurring in a subject which may be predisposed to the cancer but has not yet been diagnosed as having it; (b) inhibiting the cancer, i.e., arresting its development; or (c) relieving the cancer, i.e., causing regression of the cancer. The therapeutic agent may be administered before, during or after the onset of cancer. The treatment of ongoing cancer, where the treatment stabilizes or reduces the undesirable clinical symptoms of the patient, is of particular interest. Such treatment is desirably performed prior to complete loss of function in the affected tissues.

The subject therapy will desirably be administered during the symptomatic stage of the cancer, and in some cases after the symptomatic stage of the cancer. The terms "individual," "subject," "host," and "patient," are used interchangeably herein and refer to any mammalian subject for whom diagnosis, treatment, or therapy is desired, particularly humans. In some instances, the subject methods and compositions reduce e.g., inhibit, the proliferation of the cancer. In some instances, the subject methods and compositions reduce, e.g., inhibit, the metastasis of the cancer.

In some embodiments, the cancer is a Notch-associated cancer; that is, the cancer is associated with, i.e., due at least in part to, active Notch signaling. By "Notch" it is meant the evolutionarily conserved single-pass transmembrane receptor that affects numerous cell fate decisions through short-range cell-cell interactions (Artavanis-Tsakonas and Muskavitch 2010). Notch protein (cLIN-12 and cGLP-1 in *C. elegans*, Notch in *Drosophila*, Notch1-4 in mammals) consists of an extracellular domain (NECD) with 29-36 epidermal growth factor (EGF) repeats for ligand binding, a transmembrane domain, and an intracellular domain (NICD) having transcriptional activity. By "active Notch signaling", it is meant that the Notch protein is active in the cancer cell, e.g., it is an activated Notch, or a constitutively active Notch, e.g., the Notch protein has been mutated such that the Notch protein or a domain thereof is always active. Examples of Notch-associated cancers include hematological malignancies, e.g., acute lymphoblastic leukemia (T-ALL); mammary gland tumors, e.g., breast cancer; brain tumors, e.g., glioblastoma multiforme (GBM); lung cancer; and intestinal cancer (Artavanis-Tsakonas and Muskavitch 2010). A cancer may be readily identified as a Notch-associated cancer by detecting in a cancerous cell, e.g., in a tumor biopsy or cell smear, a Notch mutation that results in constitutively active Notch. A number of mutations have been identified that result in constitutively active Notch signaling, which may be detected by, for example, chromosome spread or PCR as known in the art. Alternatively, a cancer may be identified as a Notch-associated cancer by detecting the upregulated activity of downstream effectors of Notch signaling, e.g., the upregulated activity of the non-canonical Notch signaling proteins e.g., elevated PINK1 expression, elevated mTORC2 signaling (increased Akt phosphorylation), and elevated respiratory chain complex assembly as compared to noncancerous cells.

Notch protein modulates cell activity by a canonical pathway and non-canonical pathways. In canonical Notch pathway signaling, Notch ligands (transmembrane proteins comprising three motifs: DSL (Delta, Serrate, LAG-2), DOS (Delta and OSM-11 like) and EGF repeats) bind to the EGF repeats of the Notch extracellular domain from adjacent cells. The ligand-Notch interaction allows members of the α-secretase/metalloprotease family (ADAM10/Kuzmanian, ADAM17/TACE) to cleave the extracellular domain of Notch, leading to sequential cytoplasmic cleavage of the intracellular domain of Notch by γ-secretase (a multi-subunit protease complex composed of presenilin (PS), nicastrin (NCT), Aph-1, Pen-2 and others). The freed intracellular domain translocates to the nucleus, where it interacts via its RAM domain with the DNA-binding transcription factor CSL ("CBF1/RBPjk" in vertebrates, "Suppressor of Hairless" in Drosophila, "Lag-1" in C. elegans) and acts as a co-activator for CSL, Mastermind-like proteins ("MAML1" in vertebrates, "Mastermind" in drosophila, "Lag-3" in C. elegans) and other cofactors such as CBP/p300 to transcriptionally activate Notch target genes (Kopan and Ilagan 2009). In the absence of free intracellular domain Notch, CSL functions as a sequence-specific repressor.

Thus, genes that mediate canonical Notch signaling (that is, "canonical Notch signaling genes") would include genes encoding polypeptides of the γ-secretase complex, CSL ("CBF1/RBPjk" in vertebrates, "Suppressor of Hairless" in Drosophila, "Lag-1" in C. elegans), genes encoding Mastermind-like proteins ("MAML1" in vertebrates, "Mastermind" in drosophila, "Lag-3" in C. elegans) and the CBP/p300 gene.

Notch can also signal through non-canonical pathways. Non-canonical Notch signaling is CSL-independent and can be either ligand-dependent or independent (Kopan and Ilagan 2009). Although some genes are affected by non-canonical Notch function, in most cases the mediators of non-canonical Notch signaling are unknown. The most well studied and conserved effect of non-canonical Notch function is regulation of Wnt/β-catenin signaling. In this non-canonical Notch signaling pathway, Notch binds and titrate levels of the obligate Wnt-signaling component active β-catenin (Takebe et al. 2011). Therefore, active β-catenin activity may serve as a useful readout for non-canonical Notch signals. Other studied non-canonical Notch signaling pathways include signaling through NF-kappa B, signaling through the JNK pathway, and signaling through HES1 and MCK (Andersen et al. 2012).

Recently, mTORC2, Akt, and proteins that promote mitochondrial development or function, e.g., PINK1, mitochondrial respiratory chain complex proteins, mitochondrial fission proteins, and mitochondrial biogenesis proteins, are found to mediate non-canonical Notch signaling (Lee et al. 2013). For example, polypeptides of mitochondrial respiratory chain complex I (e.g., the 75 kDa subunit, ND-75), the mitochondrial fission protein Dynamin-1-like protein (Drp1), and the mitochondrial biogenesis protein Peroxisome proliferator-activated receptor gamma coactivator 1-alpha (PGC-1α). Importantly, many of these genes in the non-canonical Notch signaling pathway encode proteins that are regulate mitochondrial function (Lee et al. 2013). Compounds according to the present disclosure can be used for targeting Notch-promoted cancer cell proliferation, e.g., proliferation of T-ALL (Molt-4, Jurkat cell lines) and glioblastoma (T98 G, U118MG cell lines).

As an important regulator of neuronal development and function, Notch signaling is profoundly involved in many aspects of brain development, functioning, and maintenance. Deregulated Notch signaling has been implicated in the pathogenesis of brain tumor, stroke, neurodegeneration, neuropathic pain, traumatic brain injury, depression, and neuropsychiatric disorders (Mathieu et al., 2013; Zhang et al., 2018; Alfred and Vaccari, 2018). The fact that the outcome of Notch signaling is highly context-dependent suggests that non-canonical Notch function might be a norm rather than an exception. The fact that efficient inhibition of canonical Notch signaling has proved to be too toxic for clinical use, mostly due to unwanted on-target effects (Andersson and Lendahl, 2014), suggests that expanding methods for modulating Notch signaling beyond the canonical pathway will increase the available range of therapeutic options. Compounds of the present disclosure can be used for inhibiting aberrant Notch activation through the non-canonical pathway and treating a broad spectrum of brain diseases and conditions.

In some embodiments, methods for the treatment of T-acute lymphoblastic leukemia (T-ALL), small cell lung cancer (SCLC), non-small cell lung cancer (NSCL), glioblastoma, cholangiocarcinoma, non-alcoholic steatohepatitis (NASH)-driven hepatocellular carcinoma (HCC), colorectal cancer, breast cancer, and/or ovarian cancer are provided.

Compounds of the present disclosure can be administered at any suitable dose in the methods provided herein. In general, a compound will be administered at a dose ranging from about 0.1 milligrams to about 1000 milligrams per kilogram of a subject's body weight (i.e., about 0.1-1000 mg/kg). The dose of the compound can be, for example, about 0.1-1000 mg/kg, or about 1-500 mg/kg, or about 25-250 mg/kg, or about 50-125 mg/kg. The dose of the compound can be about 0.1-1 mg/kg, or about 1-50 mg/kg, or about 50-100 mg/kg, or about 100-150 mg/kg, or about 150-200 mg/kg, or about 200-250 mg/kg, or about 250-300 mg/kg, or about 350-400 mg/kg, or about 450-500 mg/kg, or about 500-550 mg/kg, or about 550-600 mg/kg, or about 600-650 mg/kg, or about 650-700 mg/kg, or about 700-750 mg/kg, or about 750-800 mg/kg, or about 800-850 mg/kg, or about 850-900 mg/kg, or about 900-950 mg/kg, or about 950-1000 mg/kg. The dose of the compound can be about 1, 2, 3, 4, 5, 10, 15, 20, 25, 30, 35, 40, 45, 50, 55, 60, 65, 70, 75, 80, 85, 90, 95, 100, 150, 200, 250, 300, 350, 400, 450, 500, 550, 600, 650, 700, 750, 800, 850, 900, 950 or 1000 mg/kg. The compounds and compositions can be administered, orally, topically, parenterally, intravenously, intraperitoneally, intramuscularly, intralesionally, intranasally, subcutaneously, or intrathecally using a suitable vehicle, including any of the compositions described above. Alternatively, the compounds and compositions can be administered via a suppository or via implantation of a slow-release device, e.g., a mini-osmotic pump.

The dosages can be varied depending upon the requirements of the patient, the severity of disease or condition being treated, and the particular formulation being administered. The dose administered to a patient should be sufficient to result in a beneficial therapeutic response in the patient. The size of the dose will also be determined by the existence, nature, and extent of any adverse side-effects that accompany the administration of the drug in a particular patient. Determination of the proper dosage for a particular situation is within the skill of the typical practitioner. The total dosage can be divided and administered in portions over a period of time suitable to treat to the disease or condition.

Administration of compounds and compositions according to the present disclosure can be conducted for a period of time which will vary depending upon the nature of the particular disorder, its severity and the overall condition of the patient. Administration can be conducted, for example, hourly, every 2 hours, three hours, four hours, six hours, eight hours, or twice daily including every 12 hours, or any intervening interval thereof. Administration can be conducted once daily, or once every 36 hours or 48 hours, or once every month or several months. Following treatment, a patient can be monitored for changes in his or her condition and for alleviation of the symptoms of the disorder. The dosage of a particular compound can either be increased in the event the patient does not respond significantly to a particular dosage level, or the dose can be decreased if an alleviation of the symptoms is observed, or if unacceptable side effects are seen with a particular dosage. The dosage regimen can consist of two or more different interval sets. For example, a first part of the dosage regimen can be administered to a subject multiple times daily, daily, every other day, or every third day. The dosing regimen can start with dosing the subject every other day, every third day, weekly, biweekly, or monthly. The first part of the dosing regimen can be conducted, for example, for up to 30 days, such as 7, 14, 21, or 30 days. A subsequent second part of the dosing regimen with a different interval administration administered weekly, every 14 days, or monthly can optionally follow, continuing for 4 weeks up to two years or longer, such as 4, 6, 8, 12, 16, 26, 32, 40, 52, 63, 68, 78, or 104 weeks.

Alternatively, if the symptoms go into remission or generally improves, the dosage may be maintained or kept at lower than maximum amount. If the condition or symptoms worsen, the first dosage regimen can be resumed until an improvement is seen, and the second dosing regimen can be implemented again. This cycle can be repeated multiple times as necessary.

V. Examples

Example 1. Synthesis of 6-Chloro-3-(2-chloro-4,5-dimethoxyphenyl)-2-mercapto-7-methoxyquinazolin-4(3H)-one (1)

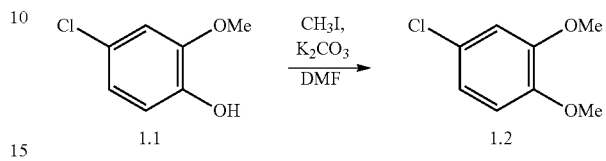

To a solution of compound 1.1 (5 g, 31.53 mmol) and $K_2CO_3$ (13 g, 94.59 mmol) in DMF (100 mL) was added $CH_3I$ (22.4 g, 157.77 mmol) at room temperature and stirred at room temperature for 16 h (monitored by TLC). The reaction was poured into water (100 mL) and the solution was extracted with EA (3×100 mL). The combined organic fractions was evaporated in vacuo. The residue was purified by silica column chromatography, eluting with PE:EA=10:1 to 3:1 to provide compound 1.2 as a light yellow liquid (5.4 g, 99% yield).

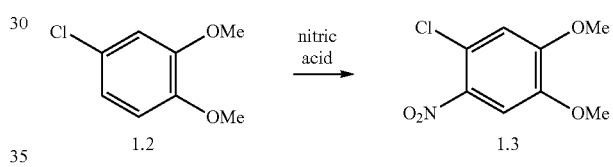

Compound 1.2 (4.3 g, 24.91 mmol) was dissolved in 50 mL of acetic anhydride. To the solution was added nitric acid (60%, 5 mL) dropwise at 15° C., and then the mixture was stirred at 15° C. for 30 mins. The reaction was poured into ice water. The precipitated crystals were collected by filtration. The collected crystals were washed with water, and dried under reduced pressure to provide compound 1.3 as light yellow solid (4.9 g, 90% yield).

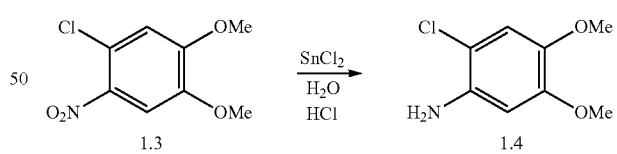

To a stirred solution of compound 1.3 (1 g, 4.61 mmol) in water (12 mL) was added $SnCl_2$ (4.28 g, 18.43 mmol) followed by slow addition of concentrated HCl and stirred at room temperature for 3 h. TLC showed it was reacted completely. The reaction was cooled to 0° C., quenched with ice, neutralized with 1N KOH and the solution was extracted with EA (3×50 mL). The organic layers were washed with brine, and dried over $Na_2SO_4$. Filtered. The filtrate was evaporated in vacuo. The residue was purified by silica column chromatography, eluting with PE:EA=10:1 to 3:1 to provide compound 1.4 as light yellow solid (550 mg, 63% yield). ESI LC-MS: $R_t$=1.230 min, 188.1[M+1]$^+$.

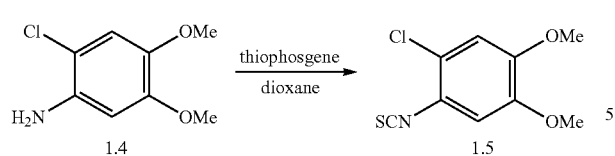

To a solution of compound 1.4 (300 mg, 1.60 mmol) in dioxane (3 mL) was added thiophosgene (0.22 mL, 2.72 mmol) and the solution was heated to reflux for 2 h. TLC showed it was reacted completely. The reaction mixture was concentrated to provide the crude product as yellow solid (360 mg, 98% yield). The crude product 1.5 was used without purification as described below.

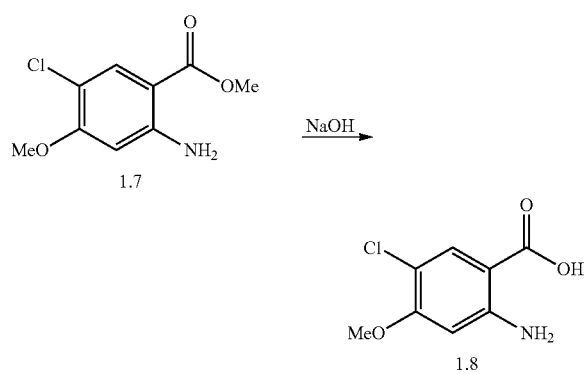

A mixture of compound 1.7 (4 g, 18.55 mmol) in a solution of NaOH (1.48 g, 37.1 mmol) in water (12 mL) was stirred at room temperature overnight. TLC showed it was reacted completely. The solution was acidified by 2N HCl and filtered. The filter cake was washed with water, dried to afford product 1.8 as a white solid (3 g, 80% yield). ESI LC-MS: $R_t$=1.321 min, 202.1[M+1]$^+$.

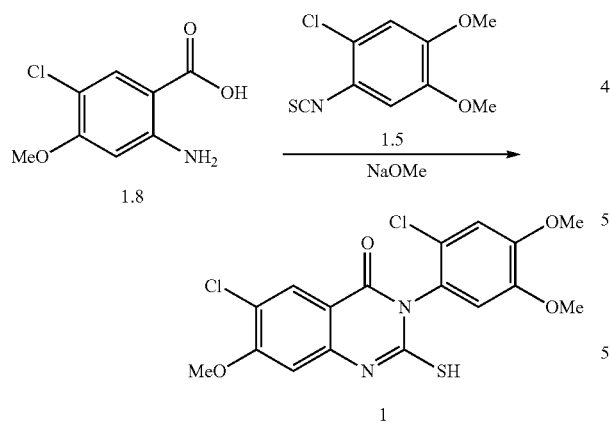

To a mixture of compound 1.5 (323 mg, 1.6 mmol) and compound 1.8 (367 mg, 1.6 mmol) in 2-propanol (6 mL) was added NaOMe (4 mg, 0.08 mmol) and stirred at reflux overnight. The mixture was concentrated and the resulting residue was suspended in DCM (20 ml) and filtered. The filter cake was washed with DCM (5 mL) to afford the product 1 as a white solid (60 mg, 10% yield). ESI/LC-MS: $R_t$=1.948 min, 413.1[M+1]$^+$. $^1$H NMR (400 MHz, DMSO) δ 13.08 (s, 1H), 7.91 (s, 1H), 7.15 (s, 1H), 7.10 (s, 1H), 7.08 (s, 1H), 3.97 (s, 3H), 3.84 (s, 3H), 3.71 (s, 3H).

Example 2. Synthesis of 6-Chloro-3-(2-chloro-4-fluoro-5-methoxyphenyl)-2-mercapto-7-methoxyquinazolin-4(3H)-one (2)

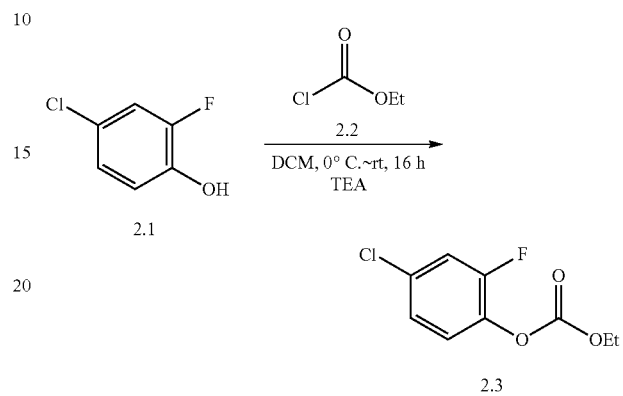

To a solution of compound 2.1 (5 g, 34.12 mmol) and TEA (10.6 g, 104.26 mmol) in DCM (20 mL) was added compound 2.2 (4.44 g, 40.94 mmol) at 0° C. and stirred at room temperature for 16 h. The solvent was removed under reduced pressure. The residue was purified by silica column chromatography, eluting with PE:EA=10:1 to 3:1 to afford compound 2.3 as light yellow solid (6.17 g, 82% yield). ESI LC-MS: $R_t$=1.316 min, 219.2[M+1]$^+$.

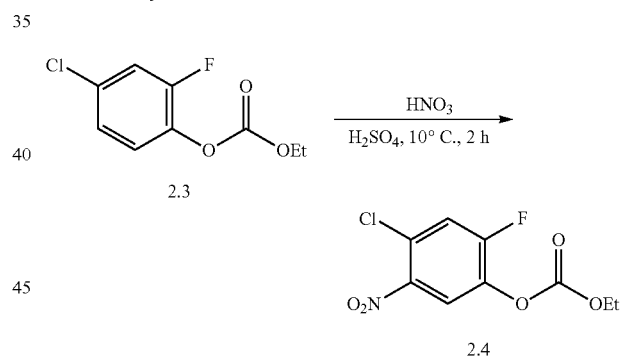

Compound 2.3 (6.17 g, 28.22 mmol) was dissolved in conc. $H_2SO_4$ (60 mL). To the solution was added nitric acid (60%, 50 mL) dropwise at 10° C., and the mixture was stirred at 10° C. for 2 h. The reaction was poured into ice water. The precipitated crystals were collected by filtration. The collected crystals were washed with water, and dried under reduced pressure to provide compound 2.4 as yellow solid (7.43 g, 99% yield). ESI LC-MS: $R_t$=1.456 min, 264.0[M+1]$^+$.

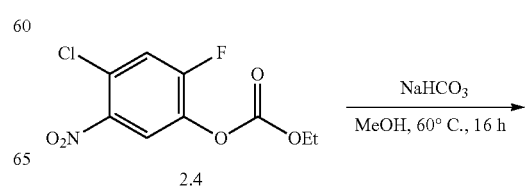

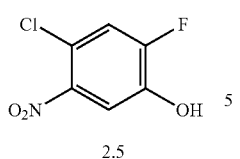

2.5

To a stirred solution of compound 2.4 (7.43 g, 28.19 mmol) in MeOH (100 mL) was added NaHCO₃ (5.92 g, 70.48 mmol) and the solution was stirred at 60° C. for 16 h. TLC showed it was reacted completely. The reaction was neutralized with 1N HCl and the solution was concentrated to afford the crude product. The residue was extracted with EA. The organic layers were washed with brine, dried over Na₂SO₄. Filtered. The filtrate was evaporated in vacuo. The residue was purified by silica column chromatography, eluting with PE:EA=10:1 to 5:1 to afford compound 2.5 as light yellow solid (5.23 g, 96% yield). ESI LC-MS: $R_f$=1.256 min, 191.9[M+1]⁺.

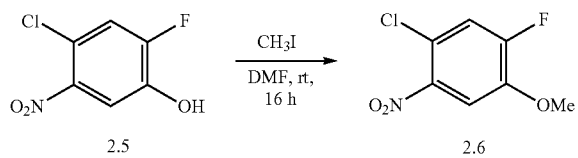 [SMILES: O=[N+]([O-])c1cc(O)c(F)cc1Cl ; "CH3I" ; "DMF, rt, 16 h" ; COc1cc([N+](=O)[O-])c(Cl)cc1F]

To a solution of compound 2.5 (5.23 g, 27.31 mmol) in DMF was added CH₃I (5 g, 35.1 mmol) at room temperature and stirred at room temperature for 16 h. The reaction was poured into H₂O. The precipitated crystal was collected by filtration. The collected crystals were washed with water, and dried under reduced pressure to provide compound 2.6 as white yellow solid (5 g, 89% yield).

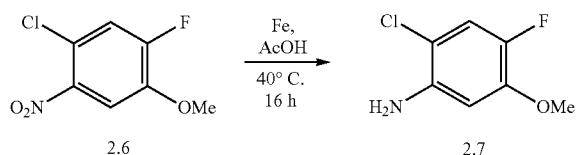

To a solution of compound 2.6 (4.1 g, 19.94 mmol) in AcOH was added Fe power (4.47 g, 79.76 mmol) at room temperature and stirred at 40° C. for 16 h. TLC showed that compound 2.6 was reacted completely. The mixture was extracted with EA. The organic layers were washed with brine and dried over Na₂SO₄. Filtered. The filtrate was evaporated in vacuo. The residue was purified by silica column chromatography, eluting with PE:EA=10:1 to 5:1 to afford compound 2.7 as light yellow solid (3.15 g, 90% yield). ESI LC-MS: $R_f$=1.306 min, 176.0[M+1]⁺.

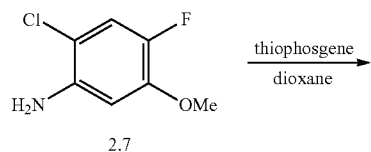

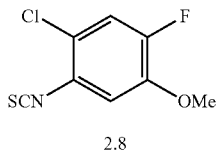

2.8

To a solution of compound 2.7 (3.15 g, 16.79 mmol) in dioxane (30 mL) was added thiophosgene (2.31 mL, 28.54 mmol) and the solution was heated to reflux for 2 h. TLC showed it was reacted completely. The reaction was concentrated to afford the crude product 2.8 as yellow solid (3.85 g, 100% yield). The crude product was used for the next step directly.

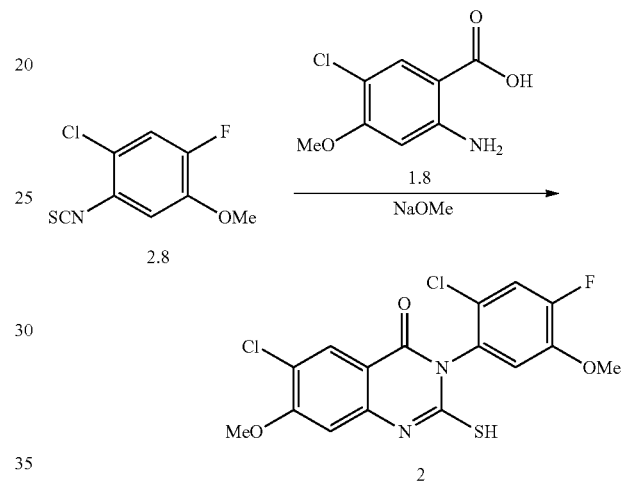

To a mixture of compound 2.8 (500 mg, 2.30 mmol) and compound 1.8 (464 mg, 2.3 mmol) in 2-propanol (6 mL) was added NaOMe (6 mg, 0.12 mmol) and the solution was stirred at refluxing overnight. Concentrated and the residue was suspended in DCM (20 ml), filtered and the filter cake was washed with DCM (5 mL) to afford product 2 as white solid (120 mg, 13% yield). ESI LC-MS: $R_f$=1.656 min, 401.0[M+1]⁺. ¹H NMR (400 MHz, DMSO) δ 13.18 (s, 1H), 7.93 (s, 1H), 7.64 (d, J=11.0 Hz, 1H), 7.44 (d, J=8.6 Hz, 1H), 7.10 (s, 1H), 3.98 (s, 3H), 3.82 (s, 3H).

Example 3. Synthesis of 6-Chloro-3-(4-chloro-2,5-dimethoxyphenyl)-2-mercapto-7-methoxyquinazolin-4(3H)-one (3)

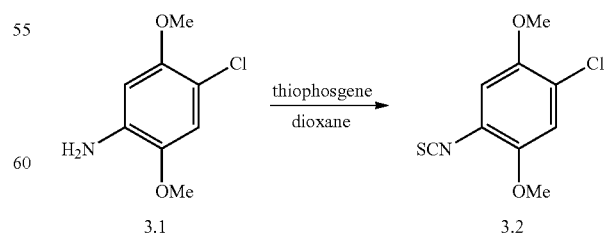

To a solution of compound 3.1 (2 g, 10.66 mmol) in dioxane (22 mL) was added thiophosgene (1.4 mL, 18.12 mmol) and the solution was stirred at refluxing for 2 h. The solvent was concentrated to afford the crude product 3.2 as yellow solid (468 mg). The crude product was used for the next step directly.

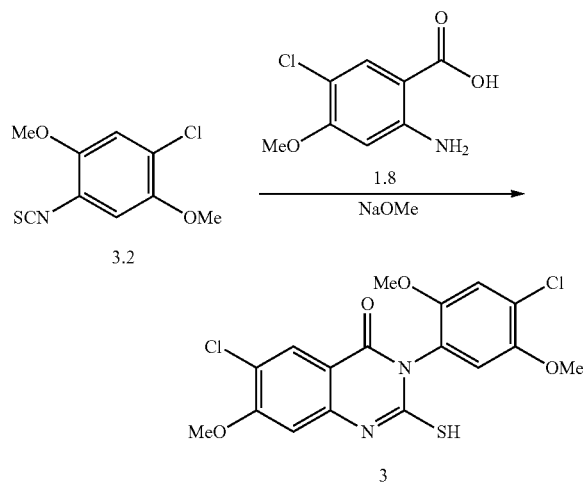

To a mixture of compound 3.2 (294 mg, 1.28 mmol) and compound 1.8 (300 mg, 1.28 mmol) in 2-propanol (5 mL) was added NaOMe (4 mg, 0.1 mmol) and the solution was stirred at refluxing overnight. The solvent was removed in vacuo. The residue was purified by Prep-HPLC to provide compound 3 (56 mg, 2% yield). ESI LC-MS: $R_t$=1.704 min, 413.0[M+1]$^+$. $^1$H NMR (400 MHz, DMSO) δ 13.05 (s, 1H), 7.89 (s, 1H), 7.29 (s, 1H), 7.17 (s, 1H), 7.08 (s, 1H), 3.95 (s, 3H), 3.75 (s, 3H), 3.69 (s, 3H).

Example 4. Synthesis of 6-Chloro-3-(2,4-dichloro-5-fluorophenyl)-2-mercapto-7-methoxyquinazolin-4(3H)-one (4)

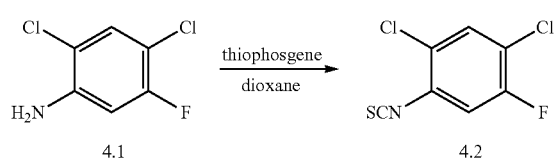

To a solution of compound 4.1 (1 g, 5.56 mmol) in dioxane (11.2 mL) was added thiophosgene (0.73 mL, 9.44 mmol) and the solution was stirred at refluxing for 2 h. TLC showed it was reacted completely. The reaction was concentrated to afford the crude product 4.2 as yellow solid (1.12 g, 100% yield). The crude product was used for the next step directly.

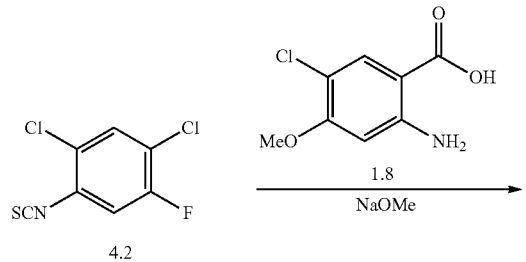

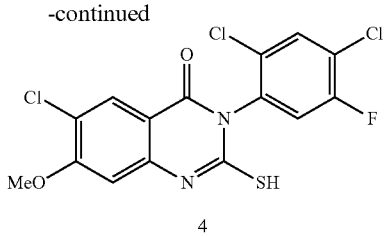

To a mixture of compound 4.2 (617 mg, 2.78 mmol) and compound 1.8 (560 mg, 2.78 mmol) in 2-propanol (10 mL) was added NaOMe (8 mg, 0.14 mmol) and the solution was stirred at refluxing overnight. Concentrated and the residue was suspended in DCM (10 ml), filtered and the filter cake was washed with DCM (5 mL) to afford the product 4 as white solid (130 mg, 11% yield). ESI LC-MS: $R_t$=1.929 min, 402.8[M−1]$^−$. $^1$H NMR (400 MHz, DMSO) δ 13.28 (s, 1H), 8.07 (d, J=7.2 Hz, 1H), 7.94 (s, 1H), 7.81 (d, J=9.4 Hz, 1H), 7.10 (s, 1H), 3.98 (s, 3H).

Example 5. Synthesis of 3-(2,4-dichloro-5-methoxyphenyl)-2-mercapto-7-methoxyquinazolin-4(3H)-one (5)

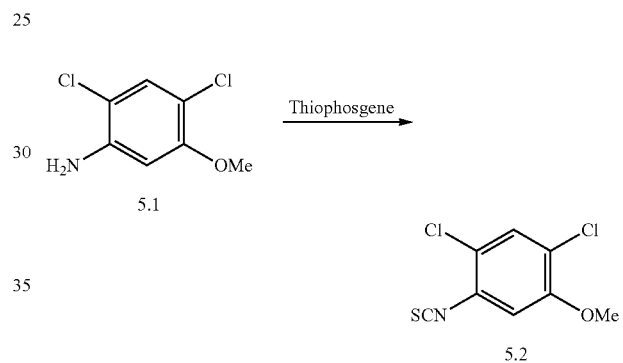

To a solution of compound 5.1 (1 g, 5.2 mmol) in dioxane (12 mL) was added thiophosgene (0.68 mL, 8.84 mmol) and the solution was stirred at refluxing for 2 h. The solvent was removed in vacuo to provide the crude product 5.2 as yellow solid (1.1 g, crude). The crude product was used for the next step directly.

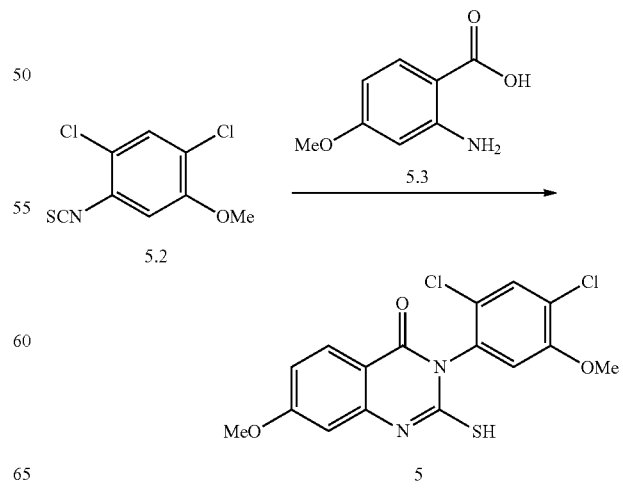

To a mixture of compound 5.2 (500 mg, 2.14 mmol) and compound 3 (357 mg, 2.14 mmol) in 2-propanol (10 mL) was added NaOMe (6 mg, 0.1 mmol) and the solution was stirred at refluxing overnight. The solvent was removed in vacuo. The residue was purified by Prep-HPLC to provide compound 5 (128 mg, 14% yield over two steps). ESI LC-MS: $R_t$=1.717 min, 381.0[M−1]$^-$. $^1$H NMR (400 MHz, DMSO) δ 13.08 (s, 1H), 7.91 (d, J=8.8 Hz, 1H), 7.78 (s, 1H), 7.44 (s, 1H), 6.98 (dd, J=8.8, 2.4 Hz, 1H), 6.94 (d, J=2.3 Hz, 1H), 3.89 (s, 3H), 3.82 (s, 3H).

Example 6. Synthesis of 3-(2,4-dichloro-5-methoxyphenyl)-2-mercapto-6,7-dimethoxyquinazolin-4(3H)-one (6)

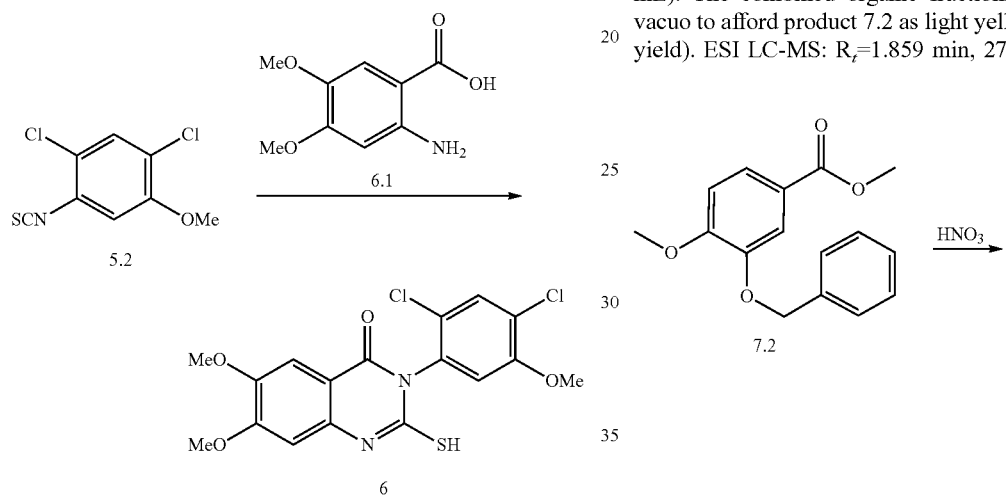

To a mixture of compound 5.2 (500 mg, 2.14 mmol) and compound 6.1 (422 mg, 2.14 mmol) in 2-propanol (10 mL) was added NaOMe (6 mg, 0.1 mmol) and the solution was stirred at refluxing overnight. The solvent was removed in vacuo. The residue was purified by Prep-HPLC to provide compound 6 (45 mg, 4.6% yield over two steps). ESI LC-MS: $R_t$=1.639 min, 412.9[M+1]$^+$. $^1$H NMR (400 MHz, DMSO) δ 13.05 (s, 1H), 7.78 (s, 1H), 7.42 (s, 1H), 7.31 (s, 1H), 7.01 (s, 1H), 3.89 (s, 3H), 3.84 (s, 3H), 3.82 (s, 3H).

Example 7. Synthesis of 3-(2,4-Dichloro-5-methoxyphenyl)-6-hydroxy-2-mercapto-7-methoxy-quinazolin-4(3H)-one (7)

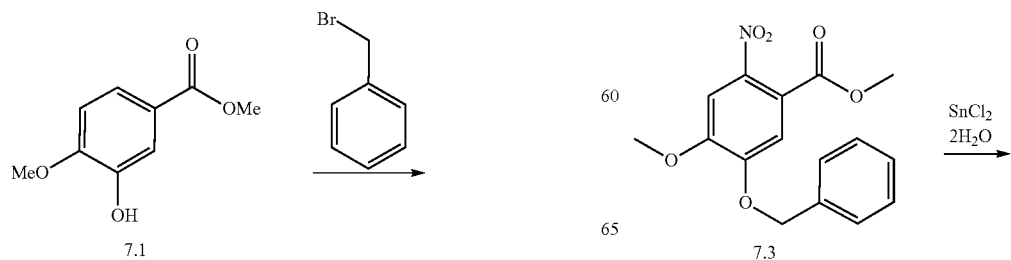

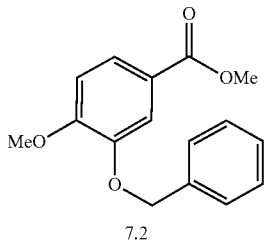

To a mixture of compound 7.1 (3 g, 16.47 mmol) and K$_2$CO$_3$ (6.8 g, 49.41 mmol) in DMF (20 mL) was added BnBr (2 mL, 16.37 mmol) in ice bath and stirred at room temperature overnight. TLC showed compound 7.1 was consumed. The mixture was extracted with EtOAc (3×50 mL). The combined organic fractions was evaporated in vacuo to afford product 7.2 as light yellow solid (3.9 g, 88% yield). ESI LC-MS: $R_t$=1.859 min, 273.0[M+1]$^+$.

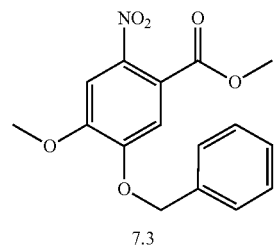

To a mixture of compound 7.2 (3.9 g, 14.32 mmol) in Ac$_2$O (80 mL) was added HNO$_3$ (1.56 mL, 21.48 mmol) dropwise at 0° C. The mixture was stirred at room temperature for 2 h. The solution was poured into ice water and the solution was extracted with EtOAc (3×50 mL). The combined organic fractions was evaporated in vacuo to afford product 7.3 as yellow solid (4.02 g, 88% yield).

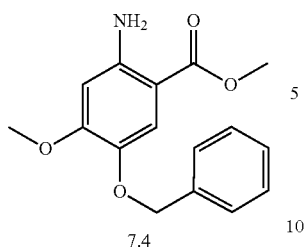

7.4

To a solution of compound 7.3 (4.02 g, 12.68 mmol) in water (33 ml) was added conc. HCl (27 mL) and SnCl$_2$ 2H$_2$O (11.45 g, 50.72 mmol). The mixture was stirred at room temperature for 2 h. The mixture was extracted with EA (3×50 mL). The combined organic fractions was evaporated in vacuo. The residue was purified by silica column chromatography, eluting with PE:EA=0% to 30% to afford compound 7.4 as white solid (440 mg, 12% yield). ESI LC-MS: R$_t$=1.788 min, 288.1[M+1]$^+$.

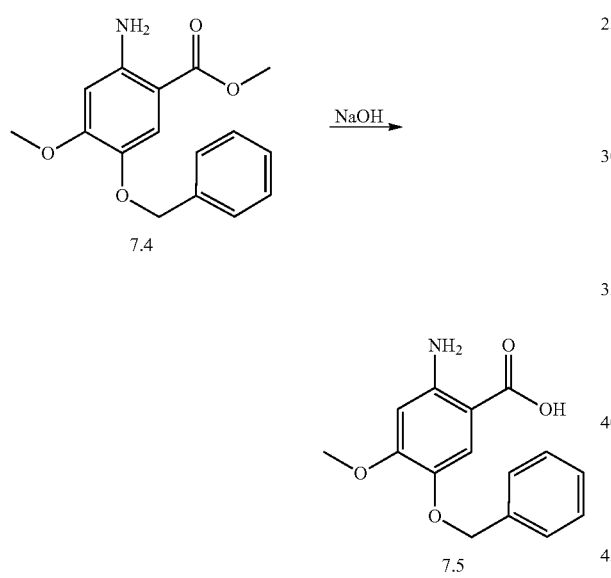

7.4

7.5

A mixture of compound 7.4 (400 mg, 1.39 mmol) and NaOH (223 mg, 5.57 mmol) in water (2.5 mL) and THF (10 mL) was stirred at 100° C. overnight. The solution was acidified with 2N HCl and filtered. The filter cake was washed with water, dried to afford product 7.5 as black solid (340 mg, 89% yield, confirmed by LCMS). ESI LC-MS: R$_t$=1.479 min, 274.0[M+1]$^+$.

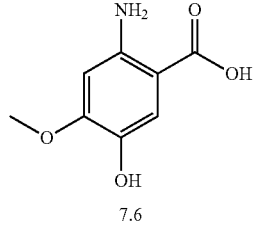

7.6

A mixture of compound 7.5 (340 mg, 1.39 mmol) and Pd/C (136 mg, 50% water) in MeOH (15 ml) under H$_2$ atmosphere was stirred at 50° C. overnight. The mixture was filtered with Celite. The filtrate was concentrated under reduced pressure to provide the crude product 7.6 as black solid (220 mg, 96% yield, confirmed by LCMS). ESI LC-MS: R$_t$=0.464 min, 184.0[M+1]$^+$. The crude product was used for the next step directly.

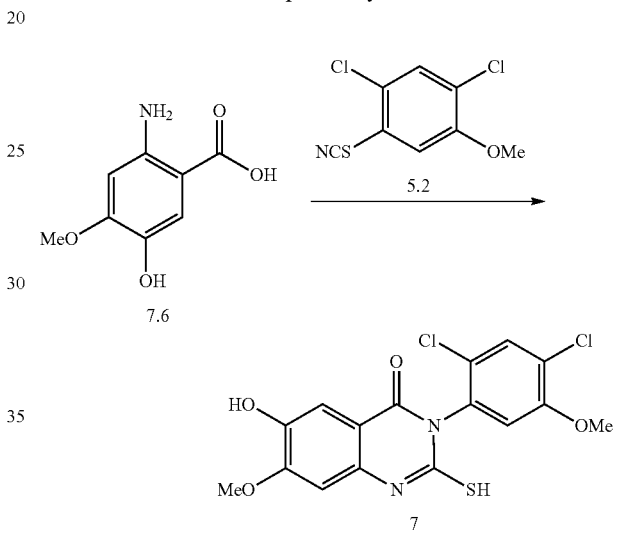

7.6

7

To a mixture of compound 7.6 (220 mg, 1.2 mmol) and compound 5.2 (337 mg, 1.44 mmol) in 2-propanol (10 mL) was added NaOMe (5 mg, 0.1 mmol) and the solution was stirred at refluxing overnight. The solvent was removed in vacuo. The residue was purified by Prep-HPLC to provide product 7 (55 mg, 9% yield). ESI LC-MS: R$_t$=1.290 min, 399.0[M+1]$^+$. $^1$H NMR (400 MHz, DMSO) δ 12.97 (s, 1H), 9.84 (s, 1H), 7.76 (s, 1H), 7.40 (s, 1H), 7.27 (s, 1H), 6.97 (s, 1H), 3.88 (s, 3H), 3.82 (s, 3H).

Example 8. Synthesis of 6-Amino-3-(2,4-dichloro-5-methoxyphenyl)-2-mercapto-7-methoxyquinazolin-4(3H)-one (8)

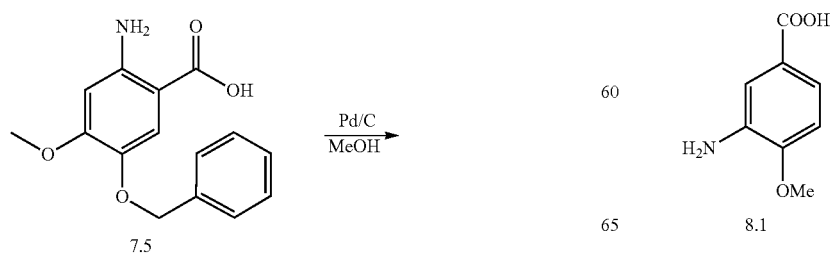

8.1

8.2

To a stirred solution of compound 8.1 (1 g, 5.98 mmol) in CH$_2$Cl$_2$ (12 ml) was added AcCl (563 mg, 7.18 mmol) dropwise at 0° C. and stirred at room temperature for 2 h. TLC showed it was reacted completely. The solvent was removed in vacuo. The residue was purified by silica column chromatography eluting PE:EA=10:1 to 3:1 to provide compound 8.2 as white solid (1.1 g, 87% yield). ESI LC-MS: R$_t$=1.043 min, 210.0[M+1]$^+$.

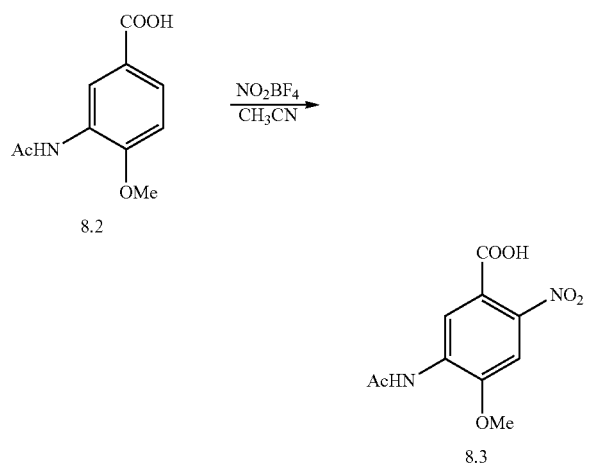

To a stirred solution of compound 8.2 (600 mg, 2.87 mmol) in CH$_3$CN (12 ml) was added NO$_2$BF$_4$ (457 mg, 3.45 mmol) at room temperature. The solution was stirred at room temperature for 3 h. TLC showed it was reacted completely. The solvent was removed in vacuo, the residue was purified by silica column chromatography eluting EtOAc in PE 0%~10% to provide compound 8.3 as white solid (520 mg, 71% yield). ESI LC-MS: R$_t$=1.183 min, 255.1[M+1]$^+$.

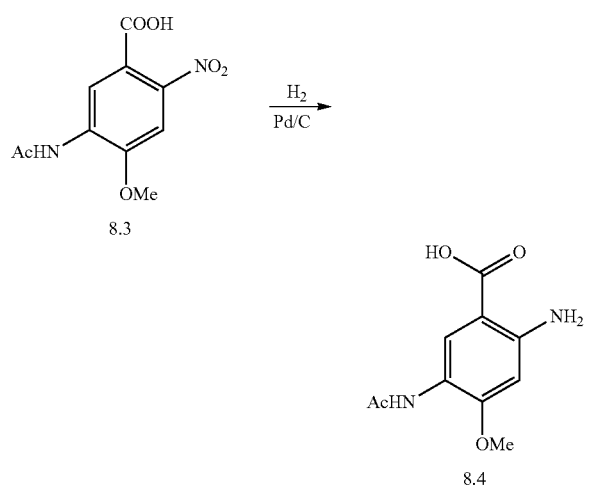

The mixture of compound 8.3 (520 mg, 2.05 mmol) and Pd/C (52 mg) in CH$_3$OH (12 mL) under H$_2$ was stirred at room temperature for 16 h. TLC showed it was reacted completely. The solvent was removed in vacuo to provide the crude compound 8.4 as white solid (425 mg, 91% yield). ESI LC-MS: R$_t$=0.905 min, 225.0[M+1]$^+$. The crude product was used for the next step directly.

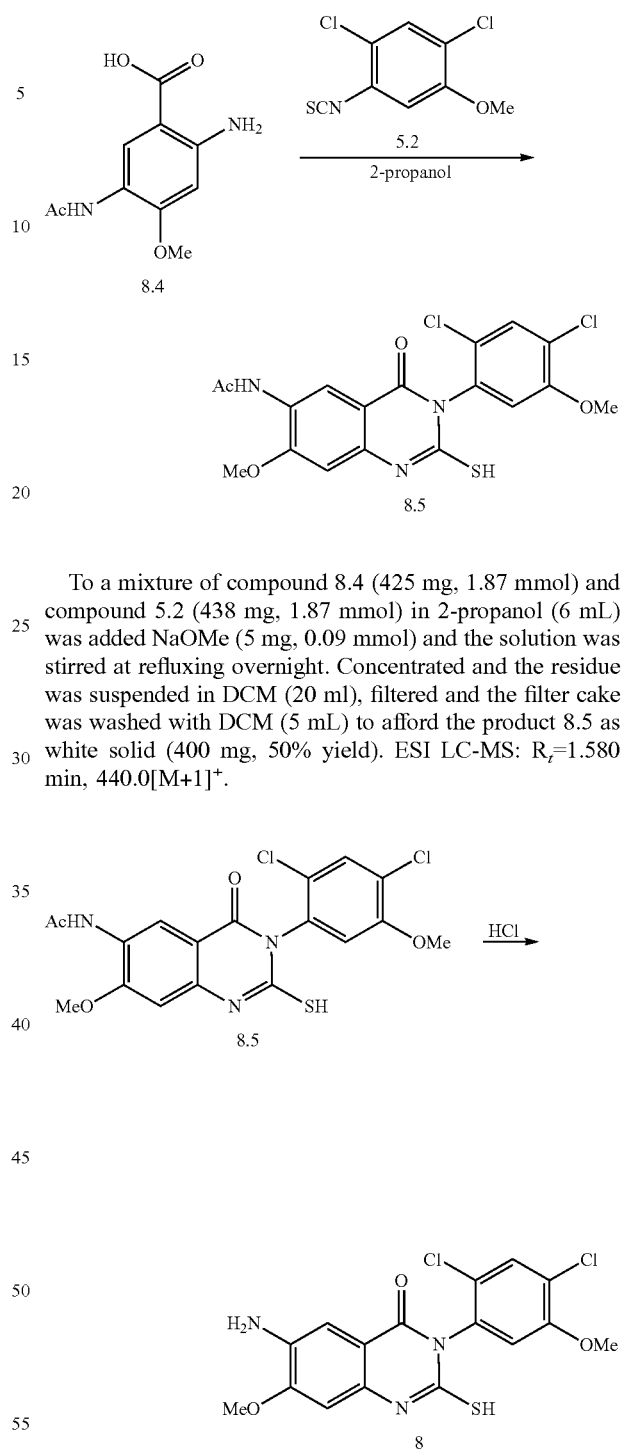

To a mixture of compound 8.4 (425 mg, 1.87 mmol) and compound 5.2 (438 mg, 1.87 mmol) in 2-propanol (6 mL) was added NaOMe (5 mg, 0.09 mmol) and the solution was stirred at refluxing overnight. Concentrated and the residue was suspended in DCM (20 ml), filtered and the filter cake was washed with DCM (5 mL) to afford the product 8.5 as white solid (400 mg, 50% yield). ESI LC-MS: R$_t$=1.580 min, 440.0[M+1]$^+$.

To a stirred solution of compound 8.5 (400 mg, 0.94 mmol) in H$_2$O (5 ml) was added concentrated HCl (5 ml) and the solution was stirred at 100° C. for 16 h. The solvent was removed in vacuo. The residue was purified by Prep-HPLC to provide product 8 as light yellow solid (50.54 mg, 14% yield). ESI LC-MS: R$_t$=1.318 min, 398.1[M+1]$^+$. $^1$H NMR (400 MHz, DMSO) δ 12.87 (s, 1H), 7.75 (s, 1H), 7.38 (s, 1H), 7.14 (s, 1H), 6.89 (s, 1H), 5.24 (s, 2H), 3.89 (s, 3H), 3.82 (s, 3H).

Example 9. Synthesis of 6-Cyclopropyl-3-(2,4-dichloro-5-methoxyphenyl)-2-mercapto-7-methoxyquinazolin-4(3H)-one (9)

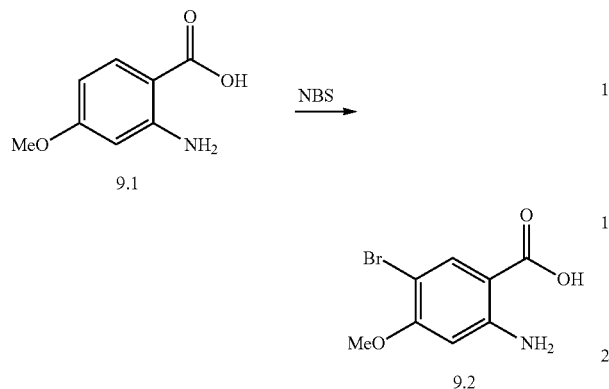

To a solution of compound 9.1 (8 g, 48 mmol) in DMF (60 mL) was added NBS (2.5 g, 56 mmol) in ice bath and the solution was stirred at refluxing for 2 h. The solution was poured into 200 mL of water and the solution was extracted with EtOAc (3×200 mL). The combined organic fractions was evaporated in vacuo to afford the crude product as brown solid (10 g, 85% yield). ESI LC-MS: $R_t$=1.357 min, 247.9[M+1]$^+$. The crude product 9.2 was used for the next step directly.

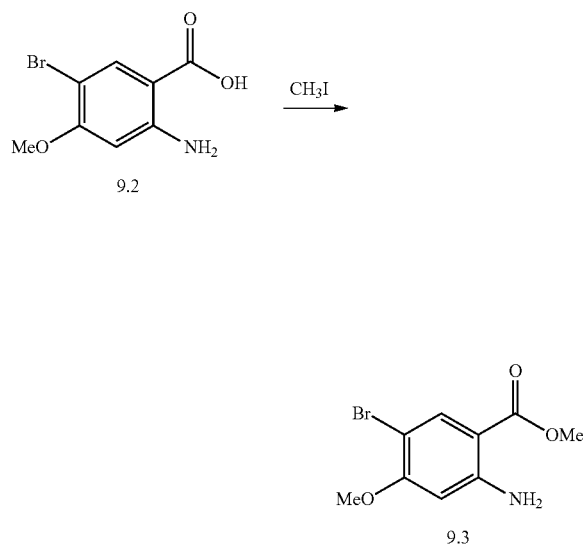

To a solution of compound 9.2 (8.4 g, 34.15 mmol) in DMF (40 mL) was added $K_2CO_3$ (14.1 g, 102.44 mmol) and $CH_3I$ (2.7 mL, 44 mmol) at room temperature. The mixture was stirred at room temperature for 2 h. poured into 100 mL of water. The mixture was extracted with EtOAc (3×200 mL). The combined organic fractions was evaporated in vacuo. The residue was purified by silica column chromatography, eluting with PE:EA=20:1 to 5:1 to afford compound 9.3 as yellow solid (4.12 g, 46% yield). ESI LC-MS: $R_t$=1.658 min, 261.9[M+1]$^+$.

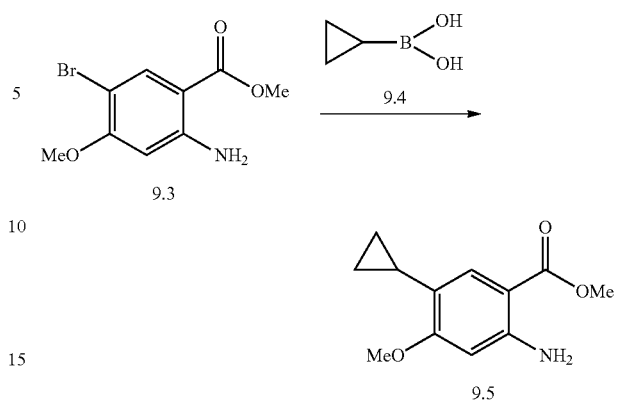

To a stirred solution of compound 9.3 (1.6 g, 6.16 mmol) in toluene/$H_2O$ (50 mL/5 mL) was added P(cy)$_3$ (259 mg, 0.93 mmol), $K_3PO_4$ (2.58 g, 12.32 mmol), Pd$_2$(dba)$_3$ (282 mg, 0.31 mmol) followed by slow addition of compound 9.4 (794 mg, 9.24 mmol) and the mixture was stirred at 100° C. for 16 h. The mixture was filtered with Celite. The filtrate was concentrated under reduced pressure to afford the crude product. The reside was purified by silica column chromatography, eluting with EA:PE=0% to 20% to afford compound 9.5 as light yellow solid (709 mg, 52% yield). ESI LC-MS: $R_t$=1.743 min, 222.1[M+1]+.

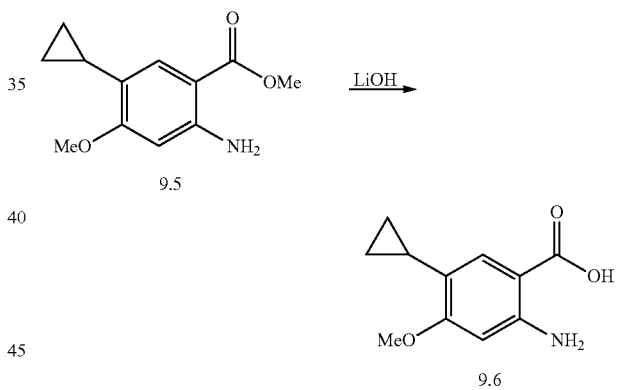

A mixture of compound 9.5 (709 mg, 3.21 mmol) and LiOH (588 mg, 14.7 mmol) in water (10 mL) and THF (40 mL) was stirred at room temperature overnight. The solution was acidified by 2N HCl and filtered. The filter cake was washed with water, dried to afford product 9.6 as a yellow solid (508 mg, 76% yield). ESI LC-MS: $R_t$=1.452 min, 208.1[M+1]$^+$.

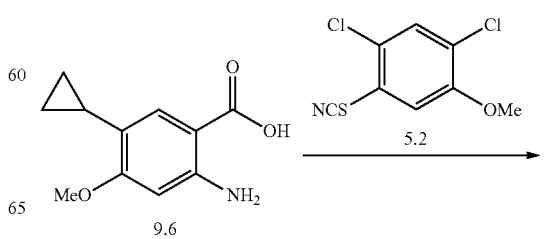

-continued

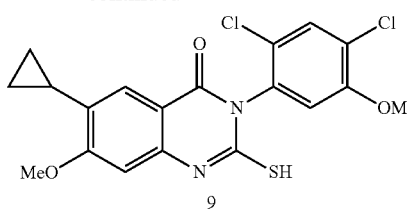

9

To a mixture of 9.6 (100 mg, 0.48 mmol) and compound 5.2 (113 mg, 0.48 mmol) in 2-propanol (4 mL) was added NaOMe (5 mg, 0.1 mmol) and the solution was stirred at refluxing overnight. The solvent was removed under reduced pressure. The residue was purified by Prep-HPLC to afford product 9 (45 mg, 22% yield). ESI LC-MS: $R_t$=1.966 min, 423.0[M+1]$^+$. $^1$H NMR (400 MHz, DMSO) δ 13.04 (s, 1H), 7.76 (s, 1H), 7.39 (s, 1H), 7.36 (s, 1H), 6.96 (s, 1H), 3.94 (s, 3H), 3.81 (s, 3H), 2.11-2.05 (m, 1H), 1.06-0.82 (m, 2H), 0.77-0.49 (m, 2H).

Example 10. Synthesis of 6-chloro-3-(2,4-Dichloro-5-methylphenyl)-2-mercaptoquinazolin-4(3H)-one (10)

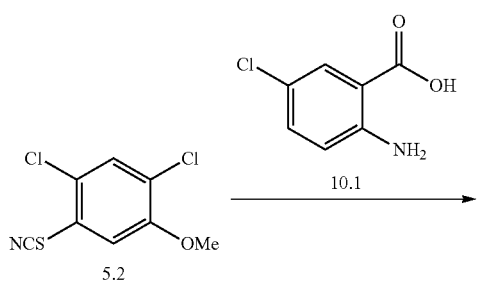

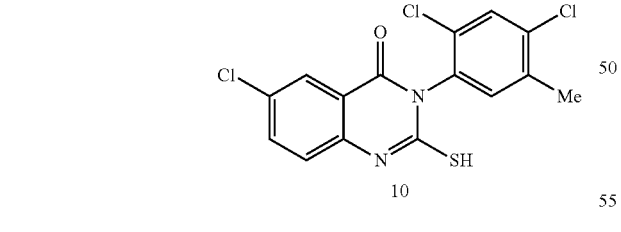

10

To a mixture of compound 5.2 (342 mg, 1.56 mmol) and compound 10.1 (268 mg, 1.56 mmol) in 2-propanol (5 mL) was added NaOMe (4 mg, 0.08 mmol) and the solution was stirred at refluxing overnight. Concentrated and the residue was suspended in DCM (10 ml), filtered and the filter cake was washed with DCM (5 mL) to afford the product 10 as white solid (79 mg, 13% yield). ESI LC-MS: $R_t$=1.853 min, 386.9[M+1]$^+$. $^1$H NMR (400 MHz, DMSO) δ 13.37 (s, 1H), 7.94 (d, J=2.4 Hz, 1H), 7.90 (dd, J=8.8, 2.5 Hz, 1H), 7.80 (s, 1H), 7.49 (d, J=8.8 Hz, 1H), 7.45 (s, 1H), 3.82 (s, 3H).

Example 11. Synthesis of 6-Chloro-7-cyclopropyl-3-(2,4-dichloro-5-methoxyphenyl)-2-mercaptoquinazolin-4(3H)-one (11)

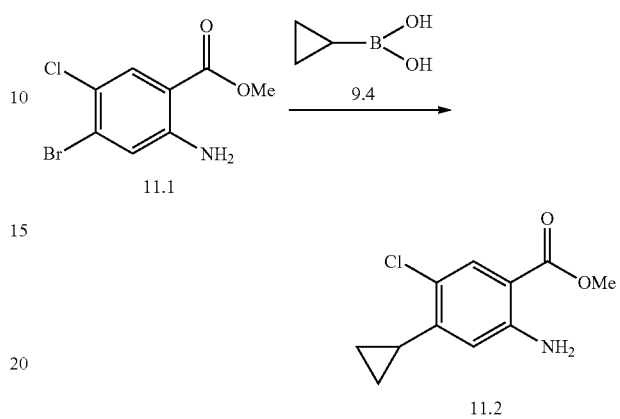

To a stirred solution of compound 11.1 (600 mg, 2.27 mmol) in toluene/H$_2$O (20 mL/2 mL) was added P(cy)$_3$ (95 mg, 0.34 mmol), K$_3$PO$_4$ (950 mg, 4.54 mmol), Pd$_2$(dba)$_3$ (104 mg, 0.11 mmol) followed by slow addition of compound 9.4 (293 mg, 3.41 mmol) and the mixture was stirred at 100° C. for 16 h. filtered with Celite. The filtrate was concentrated under reduced pressure to afford the crude product 11.2 as light yellow oil. (695 mg). ESI LC-MS: $R_t$=1.930 min, 226.0[M+1]$^+$. The crude product was used for the next step directly.

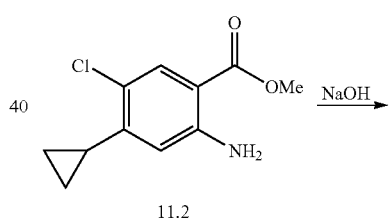

11.2

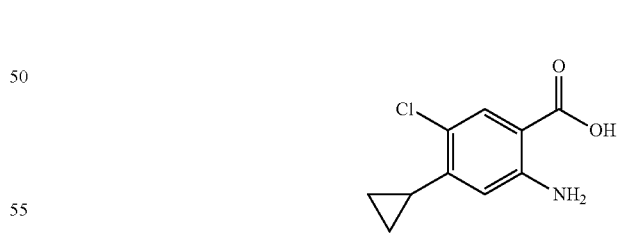

11.3

The mixture of compound 11.2 (695 mg, 3.28 mmol) and NaOH (525 mg, 13.13 mmol) in water (5 mL) and THF (20 mL) was stirred at room temperature overnight. The solution was acidified by 2N HCl and the solution was extracted with EA (3×40 mL). The organic layer was concentrated under reduced pressure. The residue was purified by reverse phase to afford the product 11.3 as yellow solid (243 mg, 35% yield). ESI LC-MS: $R_t$=1.615 min, 212.0[M+1]$^+$.

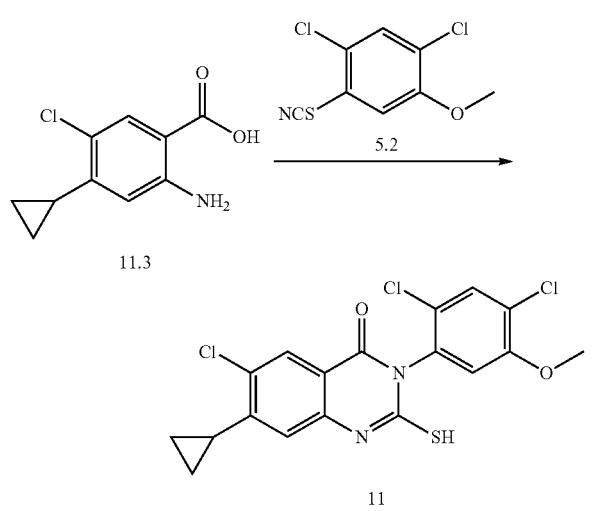

To a mixture of compound 11.3 (243 mg, 1.15 mmol) and compound 5.2 (269 mg, 1.15 mmol) in 2-propanol (4 mL) was added NaOMe (5 mg, 0.1 mmol) and the solution was stirred at refluxing overnight. The solvent was removed in vacuo. The residue was purified by Prep-HPLC to afford product 12 (74 mg, 15% yield). ESI LC-MS: $R_t$=2.065 min, 427.1[M+1]$^+$. $^1$H NMR (400 MHz, DMSO) δ 13.12 (s, 1H), 7.91 (s, 1H), 7.79 (s, 1H), 7.42 (s, 1H), 7.07 (s, 1H), 3.86-3.74 (m, 3H), 2.38-2.20 (m, 1H), 1.21-1.18 (m, 2H), 0.78-0.75 (m, 2H).

Example 12. Synthesis of 6-Chloro-3-(2,4-dichloro-5-methoxyphenyl)-2-mercapto-7-methoxy-8-vinylquinazolin-4(3H)-one (12)

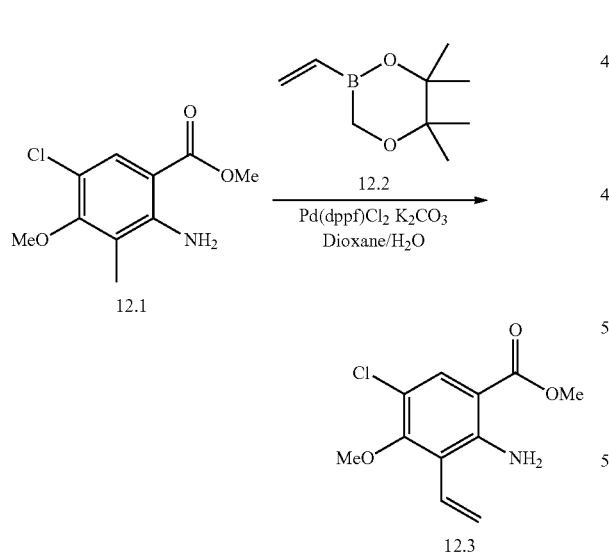

The mixture of compound 12.1 (750 mg, 2.20 mmol), Pd(dppf)Cl$_2$ (225 mg, 0.3 mmol), compound 12.2 (510 mg, 3.3 mmol) and K$_2$CO$_3$ (915 mg, 6.6 mmol) in dioxane (18 mL) and H$_2$O (3 mL) was stirred at 100° C. for 16 h. The solution was poured into water (100 mL). The solution was extracted with EA (3×30 mL). The combined organic fractions was evaporated in vacuo. The residue was purified by silica column chromatography eluting EA in PE 0~20% to afford compound 12.3 as a light yellow liquid (280 mg, 52% yield). ESI LC-MS: $R_t$=1.761 min, 242.0[M+1]$^+$.

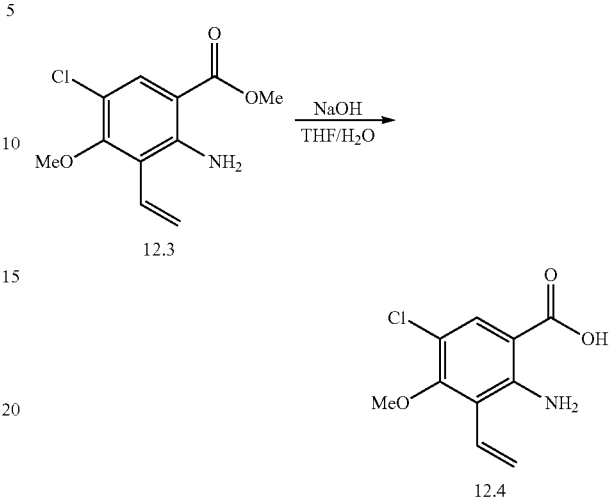

The mixture of compound 12.3 (280 mg, 1.16 mmol) and NaOH (186 mg, 4.64 mmol) in THF/H$_2$O (6 mL/6 mL) was stirred at room temperature overnight. The reaction solution was acidified by 2N HCl. Filtered. The filter cake was washed with water, dried to afford product 12.4 as white solid (224 mg, 84% yield). ESI LC-MS: $R_t$=1.471 min, 228.0[M+1]$^+$.

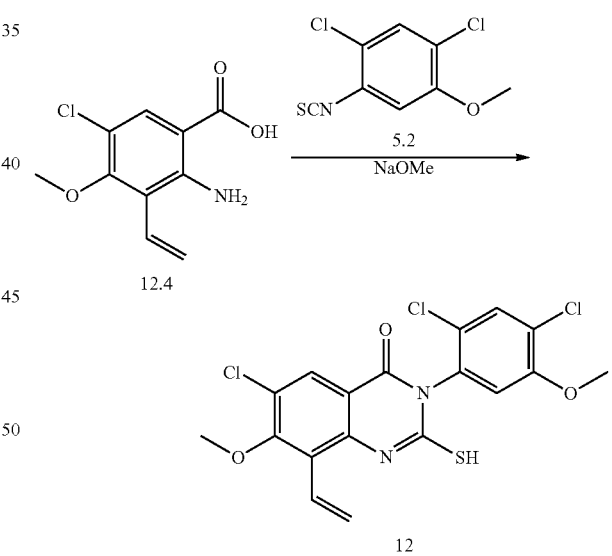

To a mixture of compound 12.4 (224 mg, 0.98 mmol) and compound 5.2 (230 mg, 0.98 mmol) in 2-propanol (10 mL) was added NaOMe (4 mg, 0.08 mmol). The solution was stirred at reflux overnight. Concentrated and the residue was suspended in DCM (20 ml), filtered and the filter cake was washed with DCM (5 mL) to afford the product 13 as white solid (41 mg, 9.43% yield, confirmed by 1H NMR and LCMS). ESI LC-MS: $R_t$=2.113 min, 443.0[M+1]$^+$. $^1$H NMR (400 MHz, DMSO) δ 11.87 (s, 1H), 7.93 (s, 1H), 7.77 (s, 1H), 7.36 (s, 1H), 7.13 (dd, J=17.6, 11.7 Hz, 1H), 5.98 (d, J=17.5 Hz, 1H), 5.76 (d J=11.7, 1H), 3.81 (s, 6H).

Example 13. Synthesis of 6-Chloro-8-cyclopropyl-3-(2,4-dichloro-5-methoxyphenyl)-2-mercapto-7-methoxyquinazolin-4(3H)-one (13)

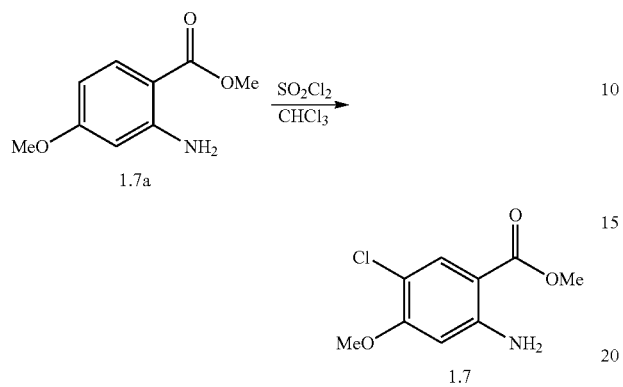

To a solution of compound 1.7a (5 g, 27.6 mmol) in CHCl$_3$ (600 ml) was added SO$_2$Cl$_2$ (2.6 mL, 33.1 mmol) in ice bath and the solution was stirred at refluxing for 4 h. The solvent was removed under reduced pressure. The residue was purified by trituration with PE/EA=1:1 (200 mL) to afford product 1.7 as white solid (3.5 g, 60% yield). ESI LC-MS: R$_t$=1.705 min, 216.0[M+1]$^+$.

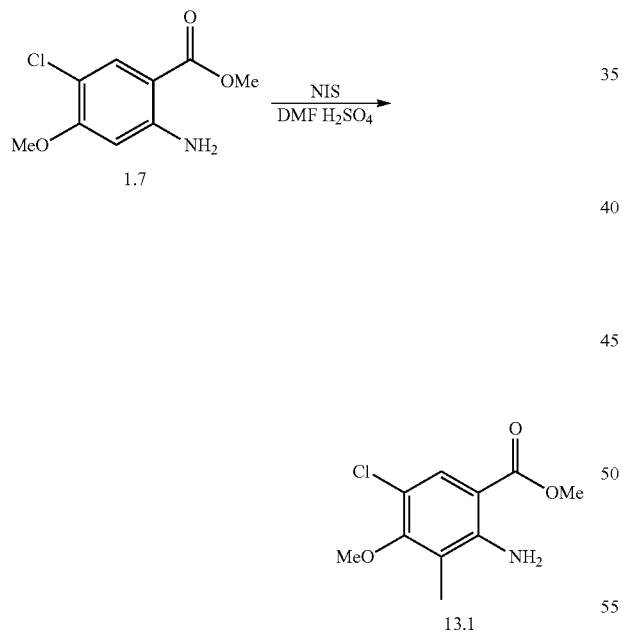

To a solution of compound 1.7 (3.5 g, 16.23 mmol) in DMF was added H$_2$SO$_4$ at room temperature, followed by portion wise addition of N-iodo succinimide (NIS) at room temperature. After 4 h the solution was poured into crushed ice. The precipitated crystals were collected by filtration. The collected crystals were washed with water, and dried under reduced pressure to provide compound 13.1 as light yellow solid (4.5 g, 81% yield). ESI LC-MS: R$_t$=2.017 min, 341.9[M+1]$^+$.

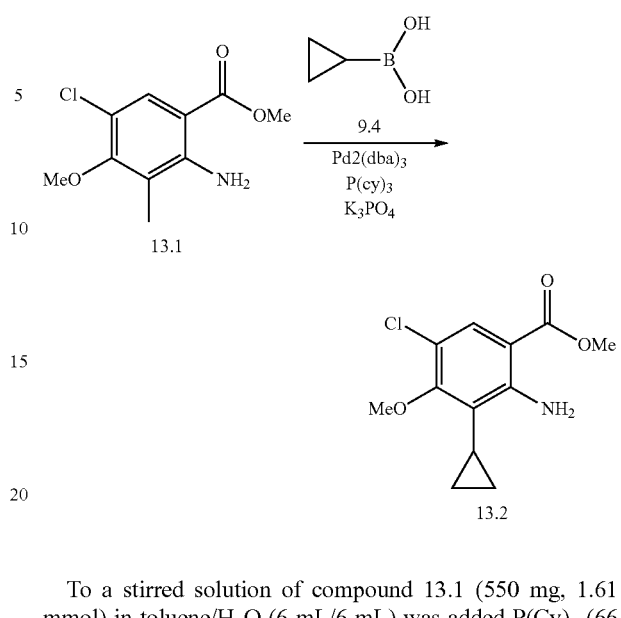

To a stirred solution of compound 13.1 (550 mg, 1.61 mmol) in toluene/H$_2$O (6 mL/6 mL) was added P(Cy)$_3$ (66 mg, 0.23 mmol), K$_3$PO$_4$ (682 mg, 3.21 mmol), Pd$_2$(dba)$_3$ (77 mg, 0.077 mmol) followed by slow addition of compound 9.4 (209 mg, 2.41 mmol) and the mixture was stirred at 100° C. for 16 h. The solution was concentrated under reduced pressure. The residue was extracted with EA. The organic layers were washed with saturated NaCl, dried over Na$_2$SO$_4$. Filtered. The filtrate was concentrated under reduce pressure. The residue was purified by silica column chromatography eluting with PE:EA=10:1 to 3:1 to afford compound 13.2 as light yellow solid (230 mg, 55% yield). ESI LC-MS: R$_t$=1.768 min, 256.0[M+1]$^+$.

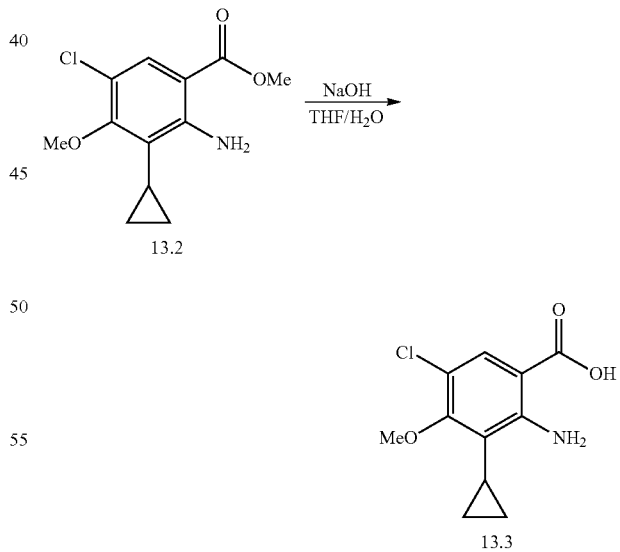

The solution of compound 13.2 (230 mg, 0.89 mmol) and NaOH (72 mg, 1.8 mmol) in THF/H$_2$O (3 mL/3 mL) was stirred at room temperature overnight. The solution was acidified by 2N HCl. Filtered. The filter cake was washed with water, dried to afford product 13.3 as white solid (200 mg, 92% yield). ESI LC-MS: R$_t$=1.348 min, 242.0[M+1]$^+$.

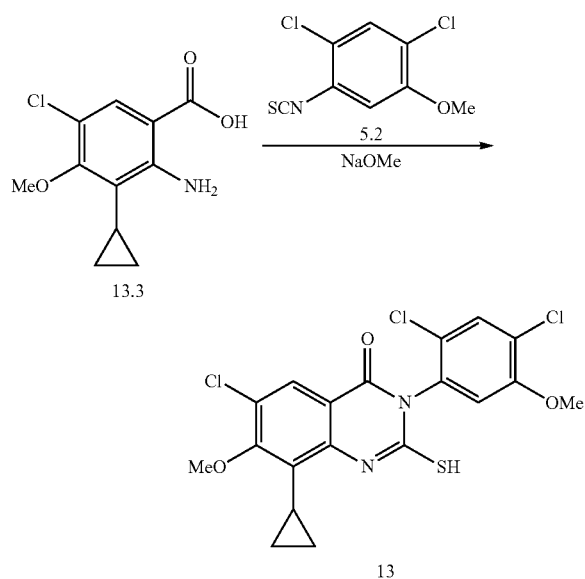

To a mixture of compound 13.3 (200 mg, 0.82 mmol) and compound 5.2 (194 mg, 0.82 mmol) in 2-propanol (5 mL) was added NaOMe (3 mg, 0.06 mmol) and the solution was stirred at refluxing overnight. Concentrated and the residue was suspended in DCM (20 ml), filtered and the filter cake was washed with DCM (5 mL) to afford the product 13 as white solid (28 mg, 7% yield). ESI LC-MS: $R_t$=1.666 min, 454.9[M−1]⁻. ¹H NMR (400 MHz, DMSO) δ 11.70 (s, 1H), 7.90 (s, 1H), 7.80 (s, 1H), 7.43 (s, 1H), 3.99 (s, 3H), 3.83 (s, 3H), 2.14-2.08 (m, 1H), 1.23-1.19 (m, 2H), 0.74-0.62 (m, 2H).

Example 14. Assessment of Quinazolinone Anti-Cancer Activity

CellTiter-Glo Luminescent Cell Viability Assay Kit was obtained from Promega. RPMI 1640 was obtained from Invitrogen. Fetal Bovine Serum (FBS) was obtained from Corning. L-glutamine was obtained from Invitrogen. 100× Penicillin-Streptomycin was obtained from HyClone. 0.05% Trypsin-EDTA (T-E) was obtained from Invitrogen. DPBS was obtained from Corning. DMSO was obtained from Sigma. Black 384 well plates were obtained from Greiner. 96-well V bottom plates were obtained from Axygen.

For cell seeding on Day "−1", the density of Molt-4 cells was adjusted according to supplier-recommended information. 50 μL cells were seeded in four 384-well-plates, and 50 μL DPBS was added to the edge wells. On Day 0, test compounds were dissolved in DMSO and stored in a nitrogen cabinet. The stock concentration of the test compounds was 120 mM. The stock concentration of the reference compounds was 10 mM. Test compounds (125 nL in DMSO) were added to the wells and serially diluted by three fold, providing 10 doses in each series with a maximum concentration of 300 μM. Equal volumes of DMSO without test compound were transferred to control rows in the well plate. Using this procedure, the DMSO concentration across the well plate was 0.25% (v/v). On Day 3 (after the cells were treated with the compounds for 72 hours), the plates were equilibrated at room temperature for approximately 30 minutes. 25 μL of CellTiter Glo reagent was added to each well, and the luminescence in each well was measured after 10 min using an ENVISION fluorescence plate reader (PerkinElmer).

The calculation formula used for data analysis was: Inhibition %=(Max−Sample Value)/Max*100. Curves were fitted by Prism with a Sigmoidal dose-response (variable slope) model and generated by 4 Parameter Logistic Model or Sigmoidal Dose-Response Model, Y=Bottom+(Top−Bottom)/(1+10^((log EC50−x)*HillSlope)).

To evaluate the anti-tumor activity of the compounds, the growth inhibitory effect of the compound was measured in various human cancer cell lines after 72 hour incubation. In the assays, the viability of the Molt-4 cells was greater than 85% during the initial cell plating. All the cell plates met the criteria that the coefficient of variation (CV)<10%. Observed $IC_{50}$ values are summarized below, along with the observed $IC_{50}$ value for reference compound 6-chloro-3-(2, 4-dichloro-5-methoxyphenyl)-2-mercapto-7-methoxyquinazolin-4(3H)-one.

| Compound No. | Activity † |
| --- | --- |
| 1 | + |
| 2 | ++ |
| 3 | ++ |
| 4 | ++ |
| 5 | ++ |
| 6 | +++ |
| 7 | +++ |
| 8 | +++ |
| 9 | +++ |
| 10 | ++ |
| 11 | ++ |
| 12 | + |
| 13 | ++ |
| Ref. 1 | ++ |

† +++: 0 μM < $IC_{50}$ ≤ 3 μM
++: 3 μM < $IC_{50}$ ≤ 30 μM
+: $IC_{50}$ > 30 μM

VI. Exemplary Embodiments

Exemplary embodiments provided in accordance with the presently disclosed subject matter include, but are not limited to, the claims and the following embodiments:

1. A compound according to Formula I:

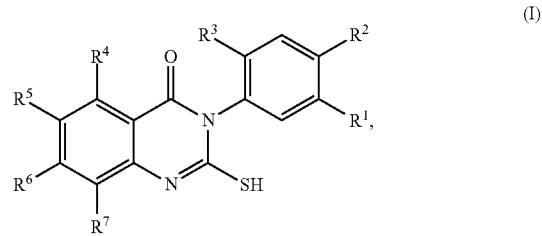

or a pharmaceutically acceptable salt thereof, wherein:
$R^1$, $R^2$, and $R^3$ are independently selected from the group consisting of $C_{1-6}$ alkyl, $C_{1-6}$ alkoxy, and halogen, wherein at least one of $R^1$-$R^3$ is halogen;
$R^4$, $R^5$, $R^6$, and $R^7$ are independently selected from the group consisting of hydrogen, halogen, $C_{1-6}$ alkyl, $C_{1-6}$ alkoxy, $C_{3-8}$ cycloalkyl, $C_{1-6}$ alkenyl, —$OR^a$, and —$N(R^b)_2$;
each $R^a$ is independently selected from the group consisting of hydrogen, $C_{1-6}$ alkyl, $C_{3-8}$ cycloalkyl, $C_{2-7}$ acyl, —C(O)$OR^{a1}$, and —C(O)N($R^{a2}$)$_2$, wherein each $R^{a1}$ is selected from the group consisting of $C_{1-6}$ alkyl, $C_{3-8}$ cycloalkyl, and $C_{6-10}$ aryl, and each $R^{a2}$ is independently selected from hydrogen, $C_{1-6}$ alkyl, $C_{3-8}$ cycloalkyl, and $C_{6-10}$ aryl;

each $R^b$ is independently selected from the group consisting of hydrogen, $C_{1-6}$ alkyl, $C_{3-8}$ cycloalkyl, $C_{2-7}$ acyl, —$SO_2R^{b1}$, —$C(O)OR^{b1}$, and —$C(O)N(R^{a2})_2$, wherein each $R^{b1}$ is selected from the group consisting of $C_{1-6}$ alkyl, $C_{3-8}$ cycloalkyl, and $C_{6-10}$ aryl, and each $R^{b2}$ is independently selected from hydrogen, $C_{1-6}$ alkyl, $C_{3-8}$ cycloalkyl, and $C_{6-10}$ aryl;

provided that at least one of $R^4$-$R^7$ is other than hydrogen when $R^1$, $R^2$, and $R^3$ are halogen;

provided that at least one of $R^4$-$R^7$ is other than hydrogen when $R^1$ is methyl, $R^2$ is chloro, and $R^3$ is methoxy;

provided that at least one of $R^4$-$R^7$ is other than hydrogen when $R^1$ is methoxy or isopropoxy, $R^2$ is chloro, and $R^3$ is chloro;

provided that at least one of $R^4$, $R^6$, and $R^7$ is other than hydrogen when $R^1$ is methoxy or isopropoxy, $R^2$ is chloro, $R^3$ is chloro, and $R^5$ is methyl or chloro; and provided that at least one of $R^4$, $R^5$, and $R^7$ is other than hydrogen when $R^1$ is methoxy or isopropoxy, $R^2$ is chloro, $R^3$ is chloro, and $R^6$ is chloro.

2. The compound of embodiment 1, or a pharmaceutically acceptable salt thereof, wherein at least one of $R^1$-$R^3$ is $C_{1-6}$ alkoxy.

3. The compound of embodiment 1 or embodiment 2, or a pharmaceutically acceptable salt thereof, wherein $R^1$ is $C_{1-6}$ alkoxy and $R^2$ is halogen.

4. The compound of embodiment 1 or embodiment 2, or a pharmaceutically acceptable salt thereof, wherein $R^1$ is $C_{1-6}$ alkoxy and $R^2$ is $C_{1-6}$ alkoxy.

5. The compound of any one of embodiments 1-4, or a pharmaceutically acceptable salt thereof, wherein $R^5$ and $R^6$ are independently selected from the group consisting of $C_{1-6}$ alkoxy, $C_{3-8}$ cycloalkyl, —$OR^a$, and —$N(R^b)_2$.

6. The compound of any one of embodiments 1-5, or a pharmaceutically acceptable salt thereof, wherein $R^4$ and $R^7$ are hydrogen.

7. The compound of embodiment 1, or a pharmaceutically acceptable salt thereof, wherein:

$R^1$ is $C_{1-6}$ alkoxy;

$R^2$ and $R^3$ are independently selected halogen;

$R^4$ and $R^7$ are hydrogen;

$R^5$ is selected from the group consisting of $C_{1-6}$ alkoxy, $C_{1-6}$ alkyl, $C_{3-8}$ cycloalkyl, $C_{1-6}$ alkenyl, —$OR^a$, —$N(R^b)_2$, and hydrogen; and $R^6$ is $C_{1-6}$ alkoxy.

8. The compound of embodiment 1, or a pharmaceutically acceptable salt thereof, wherein:

$R^1$ is $C_{1-6}$ alkoxy;

$R^2$ and $R^3$ are independently selected halogen;

$R^4$ and $R^7$ are hydrogen;

$R^5$ is halogen; and $R^6$ is selected from the group consisting of $C_{1-6}$ alkyl, $C_{3-8}$ cycloalkyl, $C_{1-6}$ alkenyl, —$OR^a$, —$N(R^b)_2$, halogen, and hydrogen.

9. The compound of embodiment 1, which is selected from the group consisting of:

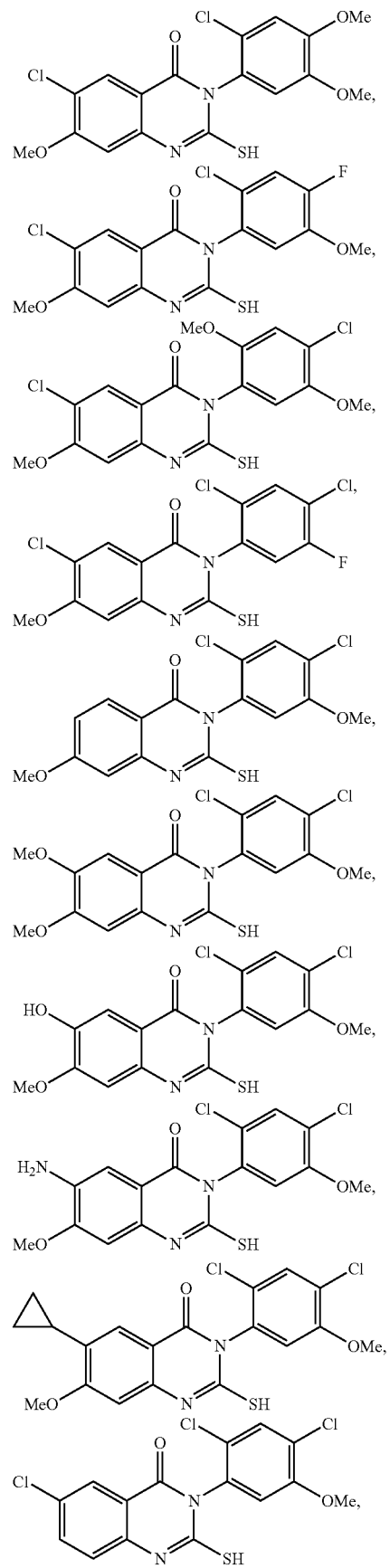

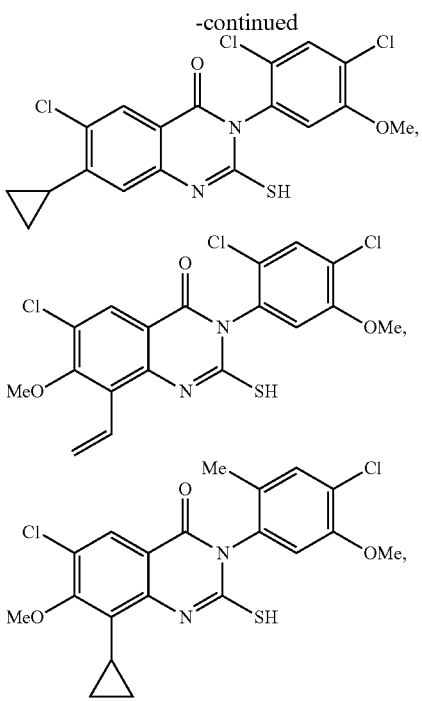

and pharmaceutically acceptable salts thereof.

10. A pharmaceutical composition comprising a compound of any one of embodiments 1-9, or a pharmaceutically acceptable salt thereof, and a pharmaceutically acceptable excipient.

11. A method for treating a disease or condition associated with mitochondrial dysfunction, the method comprising administering an effective amount of a compound of any one of embodiments 1-9, or a pharmaceutically acceptable salt thereof, or an effective amount of a composition of embodiment 10 to a subject in need thereof.

12. The method of embodiment 11, wherein the disease is cancer.

13. The method of embodiment 12, wherein the cancer is T-acute lymphoblastic leukemia (T-ALL), small cell lung cancer (SCLC), non-small cell lung cancer (NSCL), glioblastoma, cholangiocarcinoma, non-alcoholic steatohepatitis (NASH)-driven hepatocellular carcinoma (HCC), colorectal cancer, breast cancer, or ovarian cancer.

14. The method of embodiment 11, wherein the disease is a neurodegenerative disease.

15. The method of embodiment 14, wherein the neurodegenerative disease is Parkinson's disease, Alzheimer's disease, Gaucher's disease, amyotrophic lateral sclerosis, or Huntington's disease.

16. The method of embodiment 11, wherein the condition is a brain condition.

17. The method of embodiment 16, wherein the brain condition is stroke, seizure, a neuropsychiatric condition, neuropathic pain, traumatic brain injury, spinal cord injury, aneurysm, or subarachnoid hemorrhage.

18. The method of embodiment 11, wherein the disease or condition is a non-neurological disorder.

19. The method of embodiment 18, wherein the non-neurological disorder is diabetes, acute kidney injury, kidney fibrosis, non-alcoholic steatohepatitis (NASH), liver fibrosis, idiopathic pulmonary fibrosis, cardiac fibrosis, scleroderma, myelofibrosis, pancreatic fibrosis, a mitochondrial myopathy, age-related macular degeneration (AMD), a congenital mitochondrial disease, sepsis, cardiorenal syndrome, cardiac ischemia-reperfusion injury, pulmonary arterial hypertension, chronic obstructive pulmonary disease, or vasoconstriction.

20. The method of embodiment 11, wherein the condition is human aging caused by mitochondrial dysfunction.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference.

Where a conflict exists between the instant application and a reference provided herein, the instant application shall dominate.

What is claimed is:

1. A compound according to Formula I:

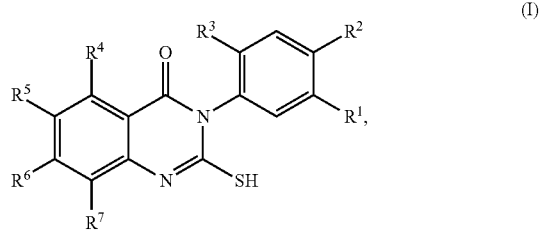

(I)

or a pharmaceutically acceptable salt thereof, wherein:

$R^1$ is selected from the group consisting of $C_{1-6}$ alkoxy, $C_{1-6}$ alkyl, and halogen;

$R^2$ and $R^3$ are independently selected from the group consisting of halogen, $C_{1-6}$ alkyl, and $C_{1-6}$ alkoxy;

at least one of $R^1$-$R^3$ is halogen;

$R^4$ and $R^7$ are independently selected from the group consisting of hydrogen, halogen, $C_{1-6}$ alkyl, $C_{1-6}$ alkoxy, $C_{3-8}$ cycloalkyl, $C_{1-6}$ alkenyl, —$OR^a$, and —$N(R^b)_2$;

$R^5$ and $R^6$ are independently selected from the group consisting of $C_{1-6}$ alkoxy, $C_{1-6}$ alkyl, $C_{3-8}$ cycloalkyl, $C_{1-6}$ alkenyl, —$OR^a$, —$N(R^b)_2$, halogen, and hydrogen;

each $R^a$ is independently selected from the group consisting of hydrogen, $C_{1-6}$ alkyl, $C_{3-8}$ cycloalkyl, $C_{2-7}$ acyl, —$C(O)OR^{a1}$, and —$C(O)N(R^{a2})_2$, wherein each $R^{a1}$ is selected from the group consisting of $C_{1-6}$ alkyl, $C_{3-8}$ cycloalkyl, and $C_{6-10}$ aryl, and each $R^{a2}$ is independently selected from hydrogen, $C_{1-6}$ alkyl, $C_{3-8}$ cycloalkyl, and $C_{6-10}$ aryl;

each $R^b$ is independently selected from the group consisting of hydrogen, $C_{1-6}$ alkyl, $C_{3-8}$ cycloalkyl, $C_{2-7}$ acyl, —$SO_2R^{b1}$, —$C(O)OR^{b1}$, and —$C(O)N(R^{a2})_2$, wherein each $R^{b1}$ is selected from the group consisting of $C_{1-6}$ alkyl, $C_{3-8}$ cycloalkyl, and $C_{6-10}$ aryl, and each $R^{b2}$ is independently selected from hydrogen, $C_{1-6}$ alkyl, $C_{3-8}$ cycloalkyl, and $C_{6-10}$ aryl;

provided that at least one of $R^4$-$R^7$ is other than hydrogen when $R^1$, $R^2$, and $R^3$ are halogen;

provided that at least one of $R^4$-$R^7$ is other than hydrogen when $R^1$ is methyl, $R^2$ is chloro, and $R^3$ is methoxy;

provided that at least one of $R^4$-$R^7$ is other than hydrogen when $R^1$ is methoxy or isopropoxy, $R^2$ is chloro, and $R^3$ is chloro;

provided that at least one of $R^4$, $R^6$, and $R^7$ is other than hydrogen when $R^1$ is methoxy or isopropoxy, $R^2$ is chloro, $R^3$ is chloro, and $R^5$ is methyl or chloro; and provided that at least one of $R^4$, $R^5$, and $R^7$ is other than hydrogen when $R^1$ is methoxy or isopropoxy, $R^2$ is chloro, $R^3$ is chloro, and $R^6$ is chloro;

wherein when $R^1$ is C1-6 alkoxy; $R^2$ and $R^3$ are independently selected halogen; $R^4$ and $R^7$ are hydrogen; $R^5$ is halogen; then $R^6$ is other than methoxy.

2. The compound of claim 1, or a pharmaceutically acceptable salt thereof, wherein at least one of $R^1$-$R^3$ is $C_{1-6}$ alkoxy.

3. The compound of claim 1, or a pharmaceutically acceptable salt thereof, wherein $R^1$ is $C_{1-6}$ alkoxy and $R^2$ is halogen.

4. The compound of claim 1, or a pharmaceutically acceptable salt thereof, wherein $R^1$ is $C_{1-6}$ alkoxy and $R^2$ is $C_{1-6}$ alkoxy.

5. The compound of claim 1, or a pharmaceutically acceptable salt thereof, wherein $R^5$ and $R^6$ are independently selected from the group consisting of $C_{1-6}$ alkoxy, $C_{3-8}$ cycloalkyl, —$OR^a$, and —$N(R^b)_2$.

6. The compound of claim 1, or a pharmaceutically acceptable salt thereof, wherein $R^4$ and $R^7$ are hydrogen.

7. The compound of claim 1, or a pharmaceutically acceptable salt thereof, wherein:
$R^1$ is $C_{1-6}$ alkoxy;
$R^2$ and $R^3$ are independently selected halogen;
$R^4$ and $R^7$ are hydrogen;
$R^5$ is selected from the group consisting of $C_{1-6}$ alkoxy, $C_{1-6}$ alkyl, $C_{3-8}$ cycloalkyl, $C_{1-6}$ alkenyl, —$OR^a$, —$N(R^b)_2$, and hydrogen; and
$R^6$ is $C_{1-6}$ alkoxy.

8. The compound of claim 1, or a pharmaceutically acceptable salt thereof, wherein:
$R^1$ is $C_{1-6}$ alkoxy;
$R^2$ and $R^3$ are independently selected halogen;
$R^4$ and $R^7$ are hydrogen;
$R^5$ is halogen; and
$R^6$ is selected from the group consisting of $C_{1-6}$ alkyl, $C_{3-8}$ cycloalkyl, $C_{1-6}$ alkenyl, —$OR^a$, —$N(R^b)_2$, halogen, and hydrogen.

9. The compound of claim 1, which is selected from the group consisting of:

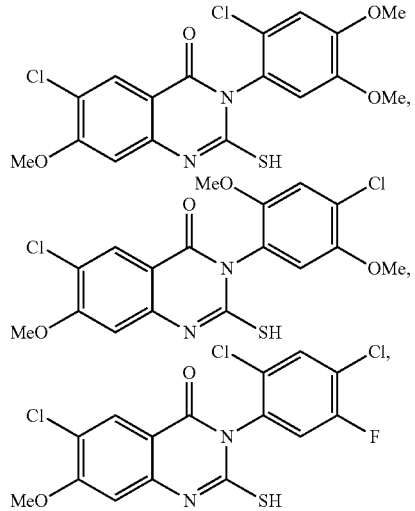

-continued

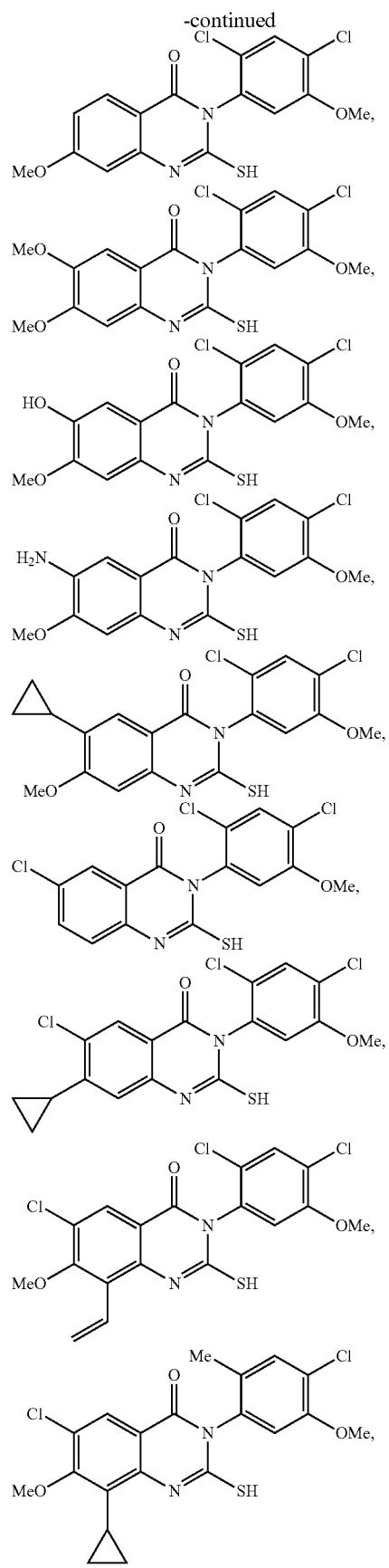

and pharmaceutically acceptable salts thereof.

10. A pharmaceutical composition comprising a compound of claim 1, or a pharmaceutically acceptable salt thereof, and a pharmaceutically acceptable excipient.

11. A method for treating a disease or condition associated with mitochondrial dysfunction, the method comprising administering an effective amount of a compound of claim 1 to a subject in need thereof.

12. The method of claim 11, wherein the disease is cancer.

13. The method of claim 12, wherein the cancer is T-acute lymphoblastic leukemia (T-ALL), small cell lung cancer (SCLC), non-small cell lung cancer (NSCL), glioblastoma, cholangiocarcinoma, non-alcoholic steatohepatitis (NASH)-driven hepatocellular carcinoma (HCC), colorectal cancer, breast cancer, or ovarian cancer.

14. The method of claim 11, wherein the disease is a neurodegenerative disease.

15. The method of claim 14, wherein the neurodegenerative disease is Parkinson's disease, Alzheimer's disease, Gaucher's disease, amyotrophic lateral sclerosis, or Huntington's disease.

16. The method of claim 11, wherein the condition is a brain condition.

17. The method of claim 16, wherein the brain condition is stroke, seizure, neuropathic pain, a neuropsychiatric condition, traumatic brain injury, spinal cord injury, aneurysm, or subarachnoid hemorrhage.

18. The method of claim 11, wherein the disease or condition is a non-neurological disorder.

19. The method of claim 18, wherein the non-neurological disorder is diabetes, acute kidney injury, kidney fibrosis, non-alcoholic steatohepatitis (NASH), liver fibrosis, idiopathic pulmonary fibrosis, cardiac fibrosis, scleroderma, myelofibrosis, pancreatic fibrosis, a mitochondrial myopathy, age-related macular degeneration (AMD), a congenital mitochondrial disease, sepsis, cardiorenal syndrome, cardiac ischemia-reperfusion injury, pulmonary arterial hypertension, chronic obstructive pulmonary disease, or vasoconstriction.

20. The method of claim 11, wherein the condition is human aging caused by mitochondrial dysfunction.

* * * * *